(12) United States Patent
Tashiro et al.

(10) Patent No.: US 6,975,836 B2
(45) Date of Patent: Dec. 13, 2005

(54) DATA BROADCASTING SYSTEM, RECEIVING TERMINAL DEVICE, CONTENTS PROVIDING SERVER, AND CONTENTS PROVIDING METHOD

(75) Inventors: Shigeru Tashiro, Yokohama (JP); Osami Suzuki, Tokyo (JP); Shuji Hirakawa, Yokohama (JP); Tsutomu Kataoka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 399 days.

(21) Appl. No.: 10/102,849

(22) Filed: Mar. 22, 2002

(65) Prior Publication Data

US 2003/0003899 A1 Jan. 2, 2003

(30) Foreign Application Priority Data

Jun. 28, 2001 (JP) ............................. 2001-197379
Jun. 28, 2001 (JP) ............................. 2001-197380
Jun. 28, 2001 (JP) ............................. 2001-197508

(51) Int. Cl.$^7$ ............................................. H04H 1/00
(52) U.S. Cl. .................. 455/3.01; 455/3.02; 455/3.03; 455/3.04; 455/419; 455/427; 725/112; 725/114; 725/95
(58) Field of Search ............................... 345/630, 502, 345/501, 520, 1.1, 1.2, 2.1, 2.3, 629, 505, 345/506; 709/200–220; 710/305–315; 718/100, 718/102–104; 719/321–324, 327, 328, 330; 455/3.01, 3.02, 3.03, 3.04, 419, 427; 370/329; 725/112, 114, 95

(56) References Cited

U.S. PATENT DOCUMENTS

| | | | | |
|---|---|---|---|---|
| 6,329,787 B1 * | 12/2001 | Ito et al. | ...................... | 320/114 |
| 6,496,896 B1 * | 12/2002 | Inoue | .......................... | 710/306 |
| 6,658,527 B1 * | 12/2003 | Hiroyasu | ..................... | 711/112 |
| 2003/0009765 A1 * | 1/2003 | Linden et al. | ................. | 725/95 |
| 2004/0168198 A1 * | 8/2004 | Nishioka et al. | ............. | 725/112 |
| 2004/0233332 A1 * | 11/2004 | Takashimizu et al. | ....... | 348/558 |

* cited by examiner

*Primary Examiner*—Lester G. Kincaid
*Assistant Examiner*—Huy Phan
(74) *Attorney, Agent, or Firm*—Oblon, Spivak, McClelland, Maier & Neustadt, P.C.

(57) ABSTRACT

A data broadcasting system of the present invention transmits contents used in a program and presentation control data specifying the manner of presentation of each content, in multiplex by assigning in arbitrary channels in each program. In this system, plural contents groups composed of at least one of real time reception type contents selectively received and reproduced in real time in the receiving terminal device, first store type contents reproduced after being stored as reception is started by selection, second store type contents read and reproduced when selected as being automatically received and stored, and parallel contents combining the real time reception type contents and the first or second storing type contents are provided a series of program.

23 Claims, 19 Drawing Sheets

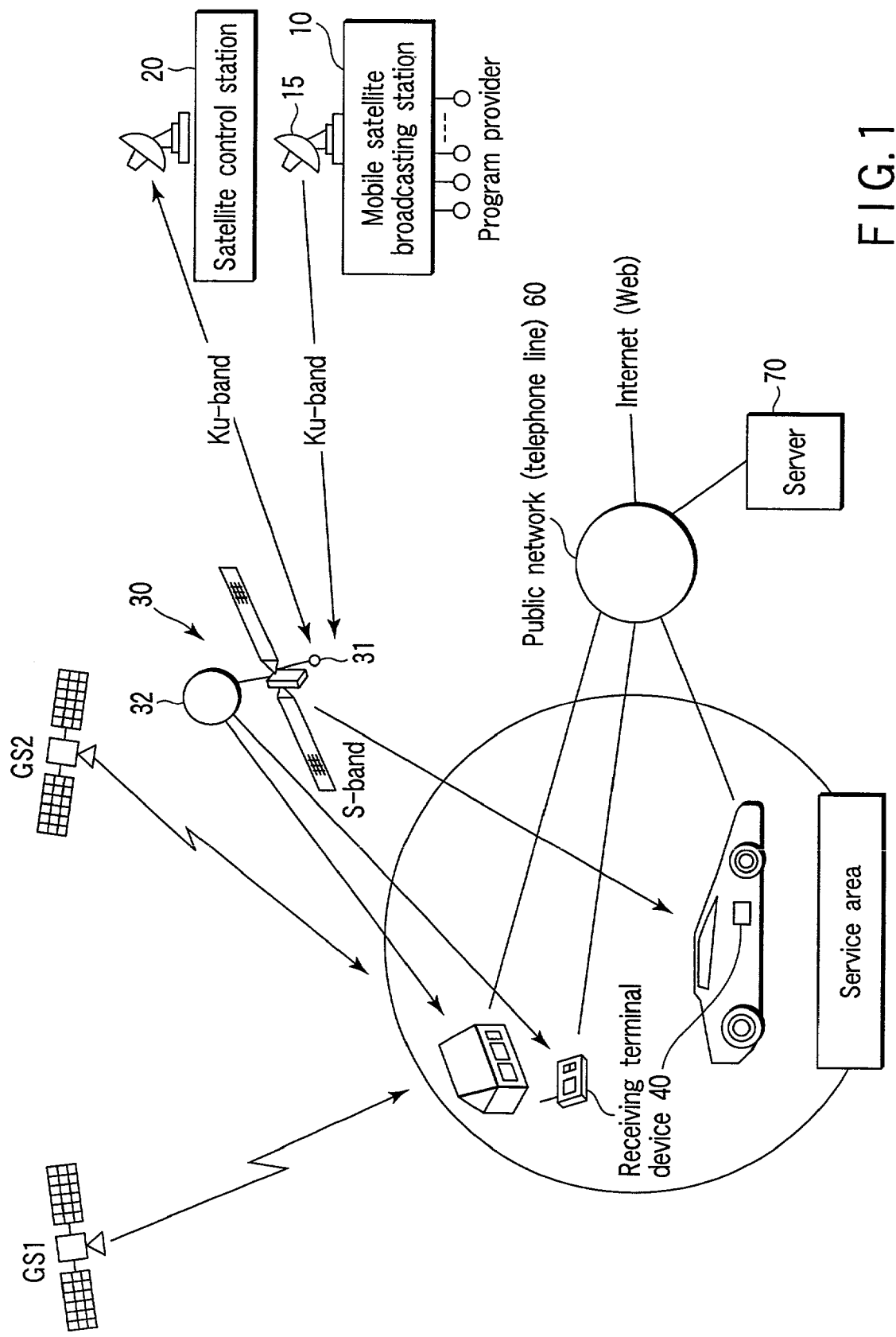
F I G. 1

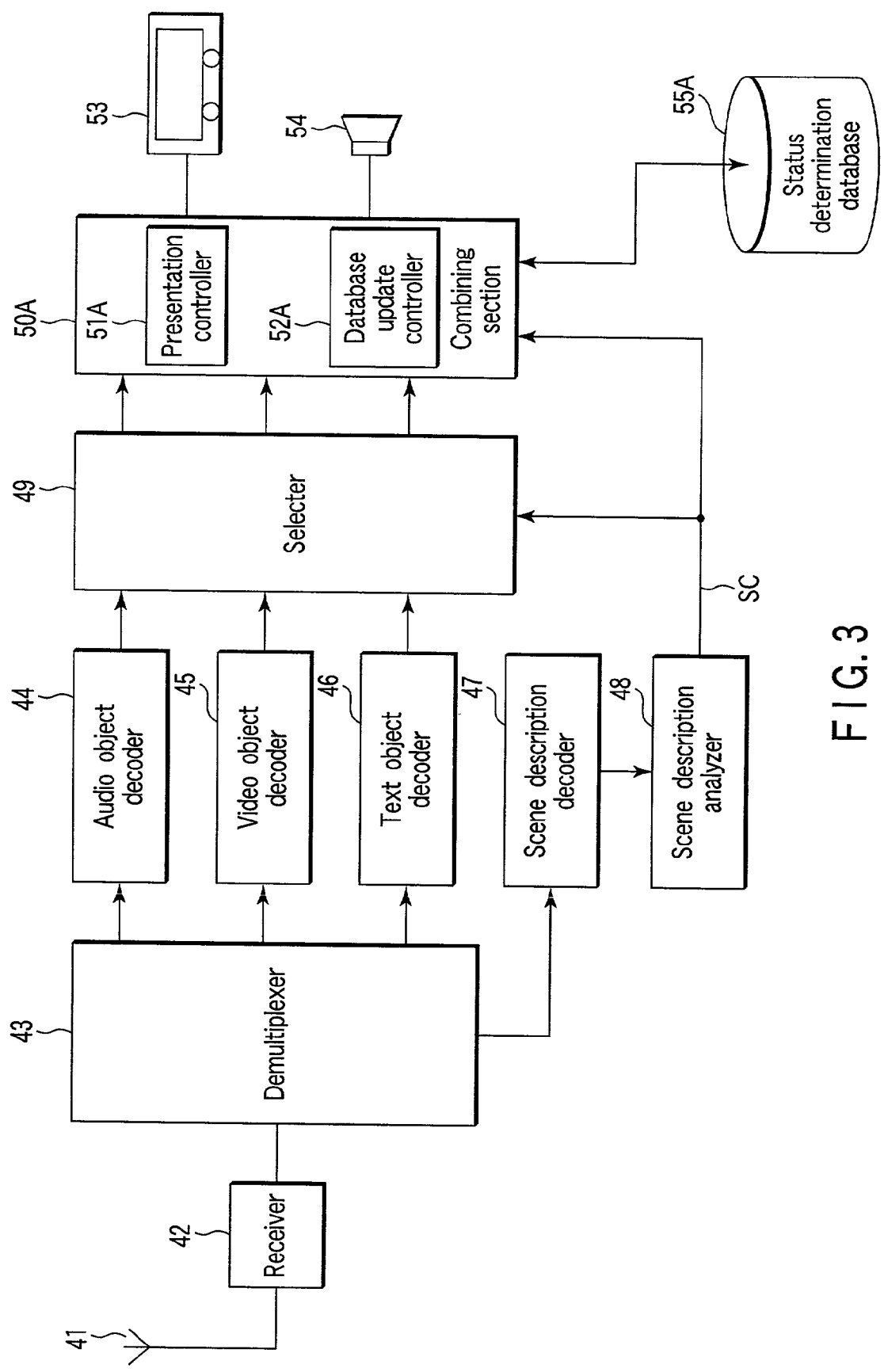
F I G. 3

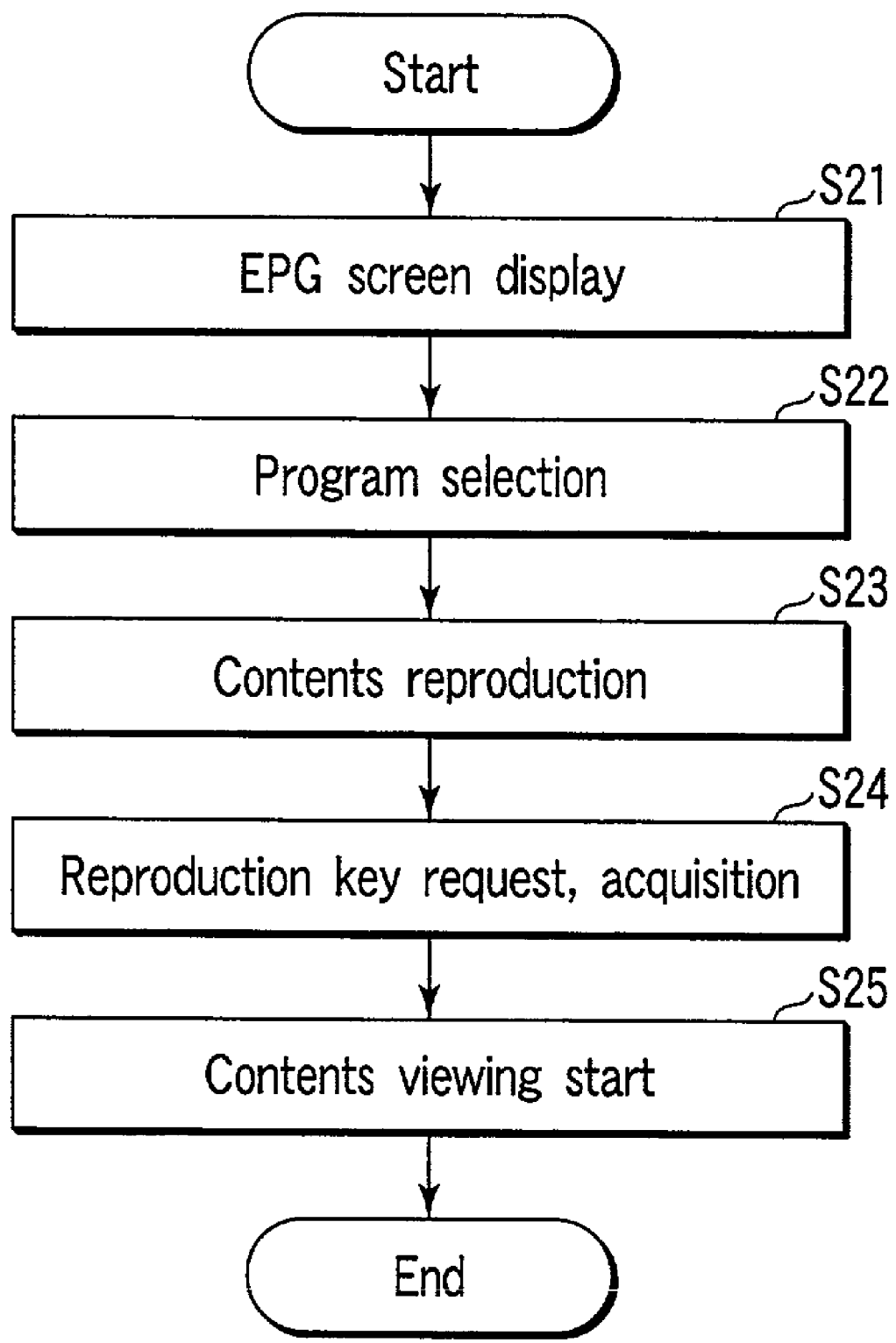
F I G. 8

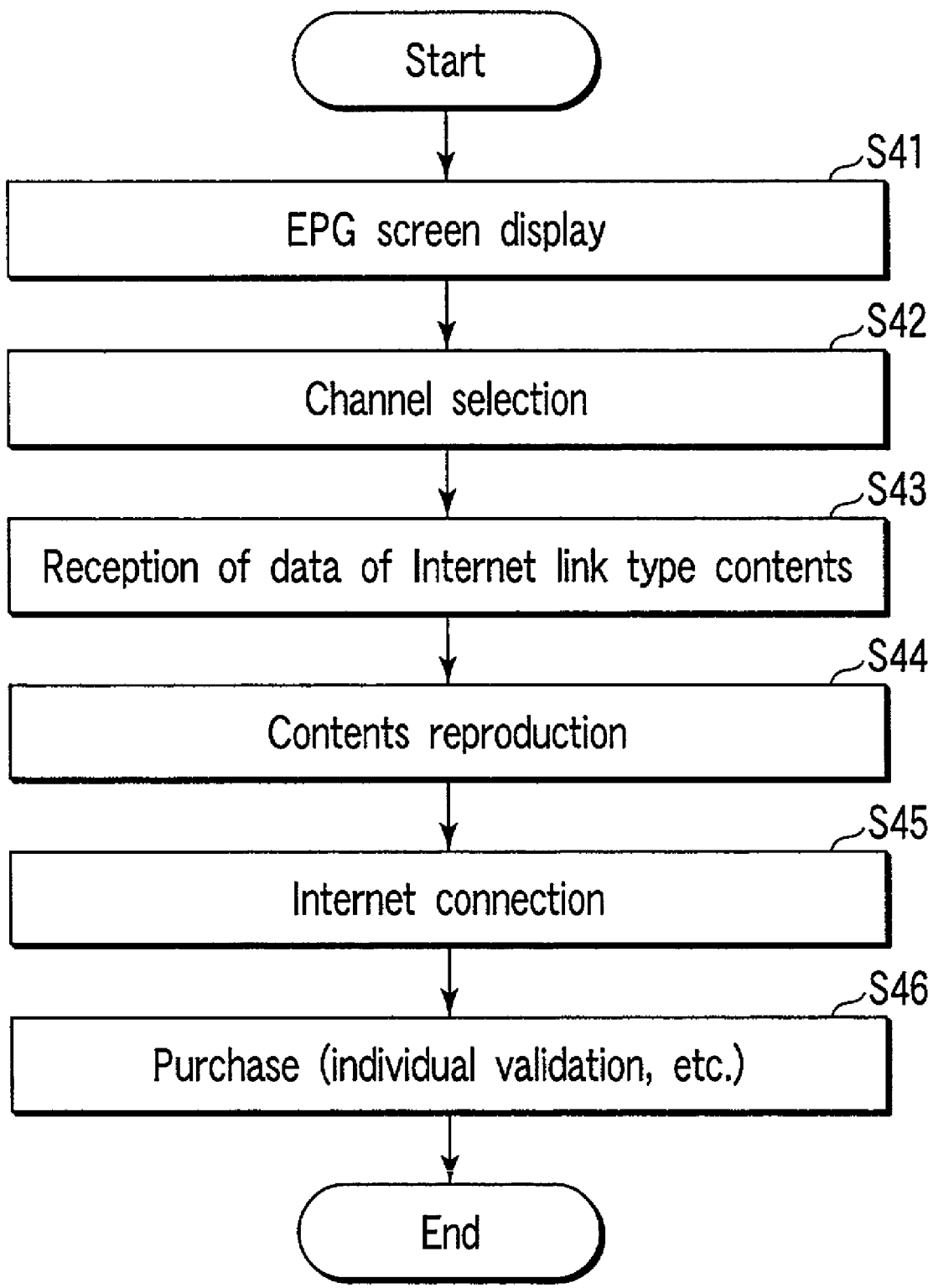
F I G. 11

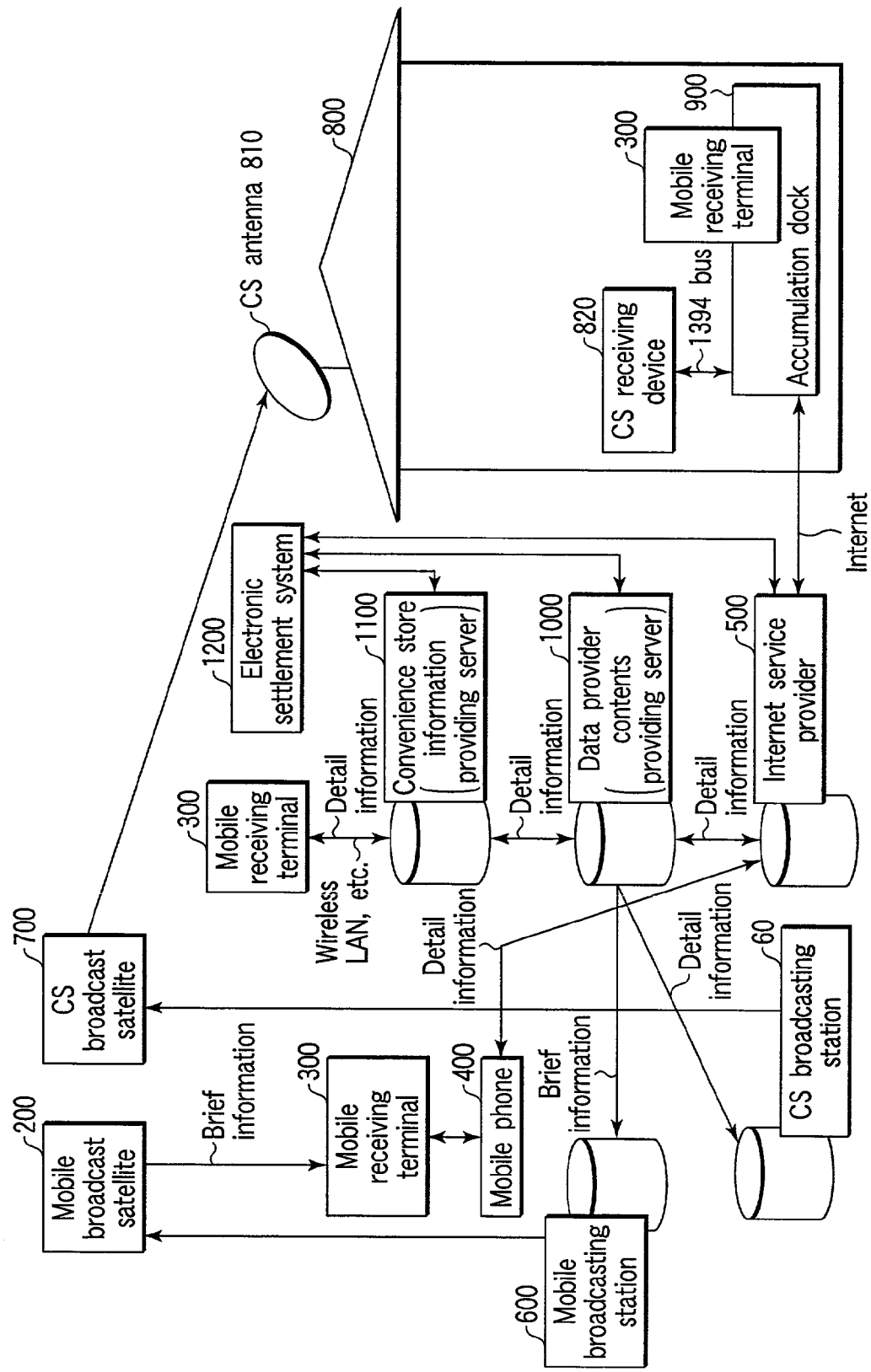
F I G. 18

DATA BROADCASTING SYSTEM, RECEIVING TERMINAL DEVICE, CONTENTS PROVIDING SERVER, AND CONTENTS PROVIDING METHOD

CROSS-REFERENCE TO RELATED APPLICATIONS

This application is based upon and claims the benefit of priority from the prior Japanese Patent Applications No. 2001-197379, filed Jun. 28, 2001; No. 2001-197380, filed Jun. 28, 2001; and No. 2001-197508, filed Jun. 28, 2001, the entire contents of all of which are incorporated herein by reference.

BACKGROUND OF THE INVENTION

1. Field of the Invention

The present invention relates to a data broadcasting system for providing data broadcasting service mainly for mobile unit or portable terminal, and a receiving terminal device used in the system and its peripheral technology.

2. Description of the Related Art

Recently, in the field of television broadcast, ground wave broadcast and satellite broadcast are being digitized and partly realized. However, the existing digital broadcasts are basically directed to fixed terminal devices, and it is technically difficult to provide mobile units and portable terminals with adequate services depending on the status of use. In particular, these broadcast program contents are intended to be reproduced all the same in any terminal device, and part of program contents cannot be selectively reproduced depending on the specification by user, specification by broadcasting station, or condition of use.

On the other hand, there is a mounting need for data broadcasting system for broadcasting multimedia information composed of video, audio and text mainly for mobile units and portable terminals. To realize this need, it is indispensable to solve these problems that have been technically difficult in the existing television broadcasts.

As mentioned above, to provide data broadcasting service mainly to mobile units and portable terminals, it is demanded to realize various program formats which have been difficult in the existing infrastructure, and provide adequate services depending on the status of use of the viewers so that desired information may be obtained whenever and wherever requested.

BRIEF SUMMARY OF THE INVENTION

It is hence an object of the invention to present a data broadcasting system capable of realizing various program formats which have been difficult in the existing infrastructure, and providing adequate services depending on the status of use of the viewers so that desired information may be obtained whenever and wherever requested, and a receiving terminal device used in this system and its peripheral devices.

The data broadcasting system of the invention comprises program providing means for providing data broadcast programs by broadcasting plural contents to be used in programs and presentation control data specifying the manner of presentation of each content, by assigning and multiplexing in arbitrary channels in each program, and a receiving terminal device which receives the data broadcast programs provided by the program providing means, separating contents and presentation control data, and presenting the contents on the basis of the presentation control data, wherein, in the receiving terminal device, the program providing means provides plural contents groups as a series of programs, the plural contents groups comprising at least real time reception type contents selectively received and reproduced in real time, first store type contents reproduced after being stored as reception is started by selection, second store type contents read and reproduced when selected as being automatically received and stored, and parallel contents combining the real time reception type contents and first or second storing type contents.

A receiving terminal device used in the data broadcasting system comprises program selecting means for selecting a program desired by a user from the series of programs, and reproducing and storing means for receiving and demodulating selectively or simultaneously the plural contents group comprising at least the real time reception type contents, first and second store type contents and parallel contents, depending on the selection operation of the program selecting means to reproduce or store.

A contents providing method used in the data broadcasting system provides first contents by the data broadcast, provides second contents relating to the first contents from a server through a communication line, and provides the first and second contents by relating to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 1 is a conceptual diagram showing a general configuration of a data broadcasting system according to the invention.

FIG. 3 is a block diagram showing a configuration of a receiving terminal device in the system.

FIG. 8 is a flowchart showing flow of operation for reproducing stored contents in the mobile receiving terminal device in a second embodiment of the present invention.

FIG. 11 is a flowchart showing a series of process from contents reception to access to common contents provided on the Internet of an application executed in the receiving terminal device in a fourth embodiment of the present invention.

FIG. 18 is a conceptual diagram showing a general configuration of a data broadcasting system in an eighth embodiment of the present invention.

DETAILED DESCRIPTION OF THE INVENTION

Figure 2:
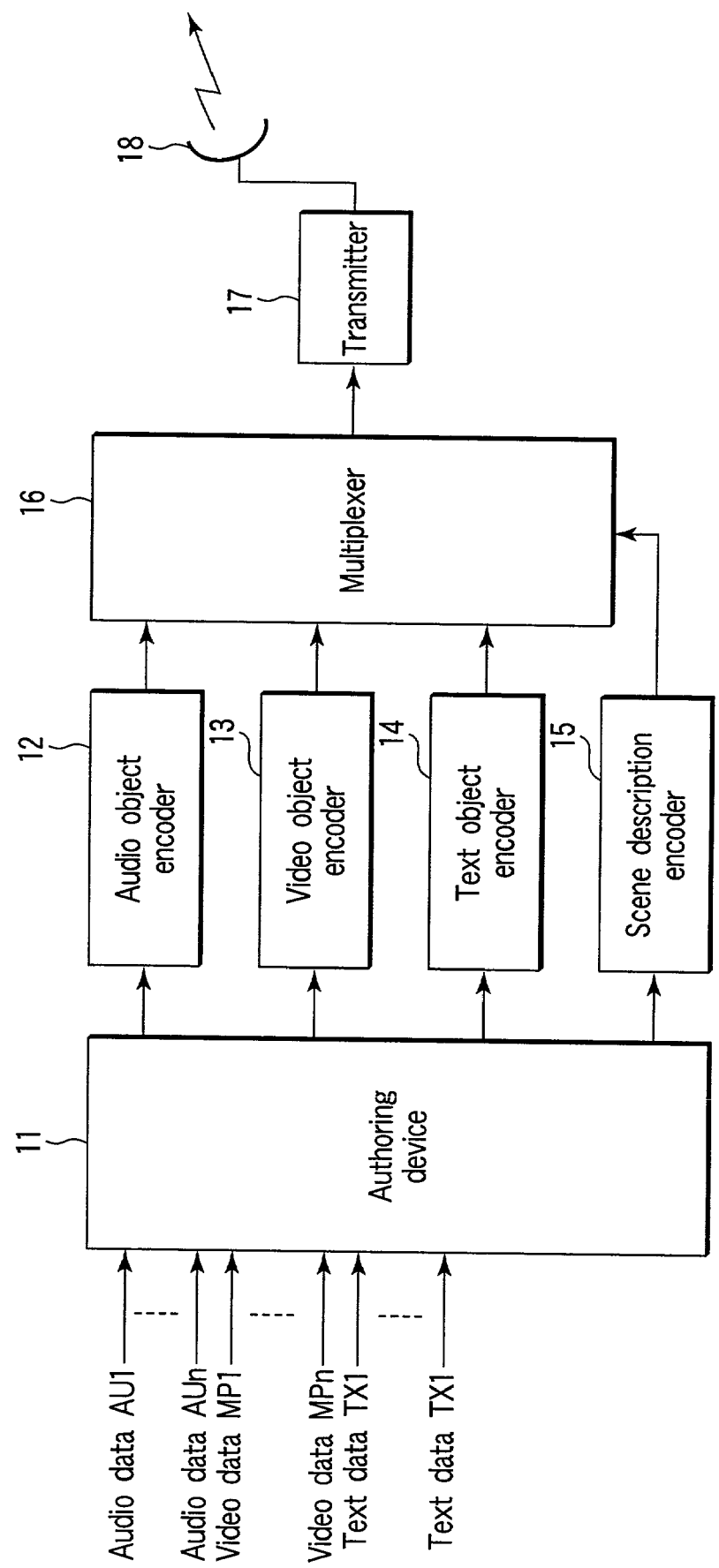
FIG. 2 is a block diagram showing a configuration of a mobile satellite broadcasting station in the system.

Referring now to the drawings, preferred embodiments of the invention are described in detail below.

First, an outline of a data broadcasting system of the invention is explained. This data broadcasting system broadcasts multimedia information composed of video, audio, text and the like mainly to terminal devices mounted on mobile units or portable terminals. At this time, as broadcast service, not only the programs are provided, but also it is a main aim that the program content itself may present flexible information depending on the need of the user and the status of use. Also, in the case of plural broadcast services, by merging with existing media, broadcast services are presented from a new viewpoint.

To realize such broadcast services, this system is intended to broadcast mainly to mobile units and portable terminals by using a broadcast satellite or a communication satellite, and employs the CDM (code division multiplex) system as transmitting method and the MPEG4 (Moving Picture Coding Experts Group 4) system as coding method, and uses an S band for downlink from the satellite to the terminal device. By such format of broadcast, multimedia information composed of video, audio, text and the like can be received in mobile receiving terminal devices such as car-mount type or portable type.

As stated above, this system is assumed to use MPEG4. By contrast to the conventional moving picture coding method that simply codes an image as one scene, the MPEG4 is designed to express a scene by synthesizing stratified video/audio signals composed of plural AVOs (audio/visual objects: component elements represented by figure and background). Stratified component elements may be either natural video/audio or synthetic video/audio. Either the entire scene or part of it may be expressed. Further, there is a large degree of freedom for overlapping of component elements and time and space relation.

That is, in this system employing the MPEG4, at the transmission side, plural contents (objects) composing one scene, and scene descriptive data for combining these contents are coded into an elementary stream by an appropriate algorithm individually, and multiplexed and transmitted. At the reception side, the received objects and scene descriptive data are decoded, and each object is synthesized according to the contents of the scene descriptive data, and issued to a presentation device such as display and speaker.

In such system configuration, since each scene of program contents is composed of one or more contents and transmitted, the contents can be selected and reproduced as required at the reception side. Accordingly, part of program contents can be selectively reproduced depending on the specification by the user, specification by the broadcasting station, or condition of use, so that the program itself can present flexible information depending on the need of the user or the status of use.

Incidentally, when the contents are synthesized and presented by using the scene descriptive data only, an inappropriate presentation may be made depending on the status of the terminal device. For example, in the case of regional contents, if such contents may be always displayed, contents being not related with the own present position may be displayed in the terminal device.

On the other hand, in such new broadcasting system, it is proposed to allow free selection of nation-wide broadcast and local broadcast, by specifying broadcast service areas individually by plural broadcasting stations. In this case, at receiving terminals of mobile unit mount type or portable type, it is beneficial for the users if desired broadcast services can be selectively receiving while moving along, and if merged with existing media, such as ground wave broadcast (television broadcast, radio broadcast) or communication means through public communication network, a new life environment will be presented to the users, which may contribute to advancement of the society of the information age.

The data broadcasting system for solving these problems is explained below while referring to preferred embodiments.

FIG. 1 is a conceptual diagram showing a general configuration of the data broadcasting system of the invention. This system is a kind of satellite broadcast, but it is called mobile satellite broadcasting (MSB) system herein in order to distinguish from the existing BS or CS digital broadcast for stationary receiving terminals, and its broadcast wave is called MSB wave. Nevertheless, the invention is not limited to the mobile satellite broadcasting system alone, but may be applied also to the data broadcasting system transmitted mainly to mobile receiving terminals at low transmission rate.

This mobile satellite broadcasting system comprises at least one mobile satellite broadcasting station 10, a satellite control station 20, and a mobile broadcasting satellite (geostationary satellite) 30.

The mobile satellite broadcasting station 10 receives program information compiled and edited by plural program providers, multiplexes each program information in channels, converts into broadcast signals, transmits to the mobile broadcasting satellite 30 through an uplink of, for example, Ku band (12.5 to 18 GHz). The channel multiplexing method is the CDM (code division multiplex) system.

The mobile broadcasting satellite 30 comprises a Ku band antenna 31 having an aperture of, for example, 2.5 m class, and an S band antenna 32 (for example, 2.6 GHz) having an aperture of 15 m class, and its operating status is monitored and controlled by the satellite control station 20. The broadcast signal transmitted from the mobile satellite broadcasting station 10 is received by the Ku band antenna 31, and converted into an S band signal by the transponder, and this converted broadcast signal is transmitted from the S band antenna 32 to the service area through an S band downlink. Herein, in the S band downlink, plural channels (for example, 30 channels) having a transmission capacity of 256 kbps are multiplexed. The method of coding transmission information is the MPEG4.

The aperture of the uplink antenna 31 mounted on the mobile broadcasting satellite 30 may be smaller than 2.5 m class, and the aperture of the S band antenna 32 is not limited to 15 m class, but may be 8 m class.

In the service area, for example, in the receiving terminal device (not shown) installed in office or home or in a mobile receiving terminal device 40 of car-mount type or portable type, the broadcast signal transmitted from the mobile broadcasting satellite 30 to the S band downlink can be received. Each receiving terminal device 40 such as mobile receiving terminal or car-mount receiving terminal accesses each server 70 by way of public network (telephone line) 60. It can be also connected to the network such as the Internet (Web).

The mobile satellite broadcasting station 10 and the receiving terminal device 40 are composed as follows. FIG. 2 is a circuit block diagram showing a configuration of the mobile satellite broadcasting station 10, and FIG. 3 is a circuit block diagram showing a configuration of the receiving terminal device 40.

First, the mobile satellite broadcasting station 10 has an authoring device 11. The authoring device 11 compiles scene information conforming to the MPEG4 by selectively using audio data AU1 to AUn, video data MP1 to MPn, and text data TX1 to TXn supplied from program providers. The scene information comprises plural objects, that is, the audio data, video data, text data, and scene descriptive data for combining these objects.

The audio data, video data, text data, and scene descriptive data issued from the authoring device 11 are respectively put into an audio object encoder 12, a video object encoder 13, a text object encoder 14, and a scene description encoder 15. In these encoders 12 to 15, the audio data, video data, text data, and scene descriptive data are encoded into elementary streams by appropriate algorithm suited to each property. The coded elementary streams are sequentially multiplexed into a specified format in a multiplexer 16, and a multiplex stream is obtained. The multiplex stream is digitally modulated in a transmitter 17, further converted into Ku band broadcast signal, and transmitted from a transmitting antenna 18 toward the mobile broadcasting satellite 30.

On the other hand, the receiving terminal device 40 has a receiving antenna 41 for receiving the S band broadcast signal transmitted from the mobile broadcasting satellite 30. The broadcast signal received in this receiving antenna 41 is put into a Receiver 42. In the Receiver 42, the broadcast signal is converted in frequency, and digitally demodulated, and the demodulated multiplex stream is put into a demultiplexer 43. The demultiplexer 43 is to separate the multiplex stream into plural elementary streams, and each elementary stream is input into an audio object decoder 44, a video object decoder 45, a text object decoder 46, and a scene description decoder 47, respectively according to the type.

The audio object decoder 44, video object decoder 45, text object decoder 46, and scene description decoder 47 are designed to decode the audio object, video object, text object, and scene descriptive data respectively from the entered elementary streams, and the decoded audio object, video object, and text object are put into a combining section 50A through a Selector 49 individually.

The scene descriptive data decoded in the scene description decoder 47 is put into a scene description analyzer 48. This scene description analyzer 48 analyzes the behavior of each object from the entered scene descriptive data, and the scene description analysis data SC is put into the Selector 49 and combining section 50A. The Selector 49 passes the objects necessary for synthesizing the scene on the basis of the scene description analysis data SC, and the combining section 50A combines each object on the basis of the scene description analysis data SC.

The receiving terminal device 40 also has a status determination database 55A for processing depending on the status of use preliminarily. In this status determination database 55A, the type information of the objects to be presented is stored preliminarily. The objects are managed as being divided into default data and setting data. The default data is the data already written in the receiving terminal device 40 before shipping. The setting data can be arbitrarily set and registered by the user by manipulating a key input unit (not shown) in the drawing.

The combining section 50A comprises a presentation controller 51A and a database update controller 52A.

The presentation controller 51A determines, for example, whether the battery is being used or the commercial power source is being used (the battery is being charged), and determines the status of use of the receiving terminal device 40 on the basis of the determination result, that is, whether being carried or received in stationary status, then compares the present position depending on the status with the region stored in the status determination database 55A. When the region including the present position is being stored, the object corresponding to this region is selected from the plural receiving objects entered from the Selector 49, and this selected object is synthesized according to the scene description analysis data SC, and is supplied to the display 53 or speaker 54 or both.

The database update controller 52A updates the corresponding data in the status determination database 55A, according to the contents analyzed by the scene description analyzer 48, when database update data is sent from the mobile satellite broadcasting station 10 by using the scene descriptive data. Update process includes change or deletion of already registered object, and addition of object.

Although not shown, the receiving terminal device 40, comprising a mobile phone function, also has a function of accessing various servers or connecting to the Internet through telephone lines.

In this system configuration, specific broadcast services include stand-alone function, car-mount function, link with mobile phone (integration with ordering, settling and charging function), and merge with other major media.

Examples of stand-alone function include general programs such as movie, drama, news, sports and variety show by ordinary television broadcast (real time type contents), movie and music promotion program as data and audio programs, information journal contents, short subjects, print information, reading, shopping information, ordinary video and music program, and game distribution.

Examples of car-mount function include ITS car navigation information, combination with car server system (link with high speed Internet), upscale entertainment (link with total entertainment center), and game arcade (link with game producing house).

Link with mobile phone includes TV commerce (shopping, ticket sales, banking, etc.), POD (program on demand), movie, animation, game, music, book reading, acquisition of print information, security business, personal education (preparatory school type model, etc.), expanded information communication mode (mail, Internet), SOHO activity support, and hand-held navigation.

Merge with other major media includes mutual complement with ground wave digital broadcasting function, cooperation with e-platform (information moving by bridge media of stored data by large capacity storage device), game, and newspaper reading in commuter train.

Figure 4:
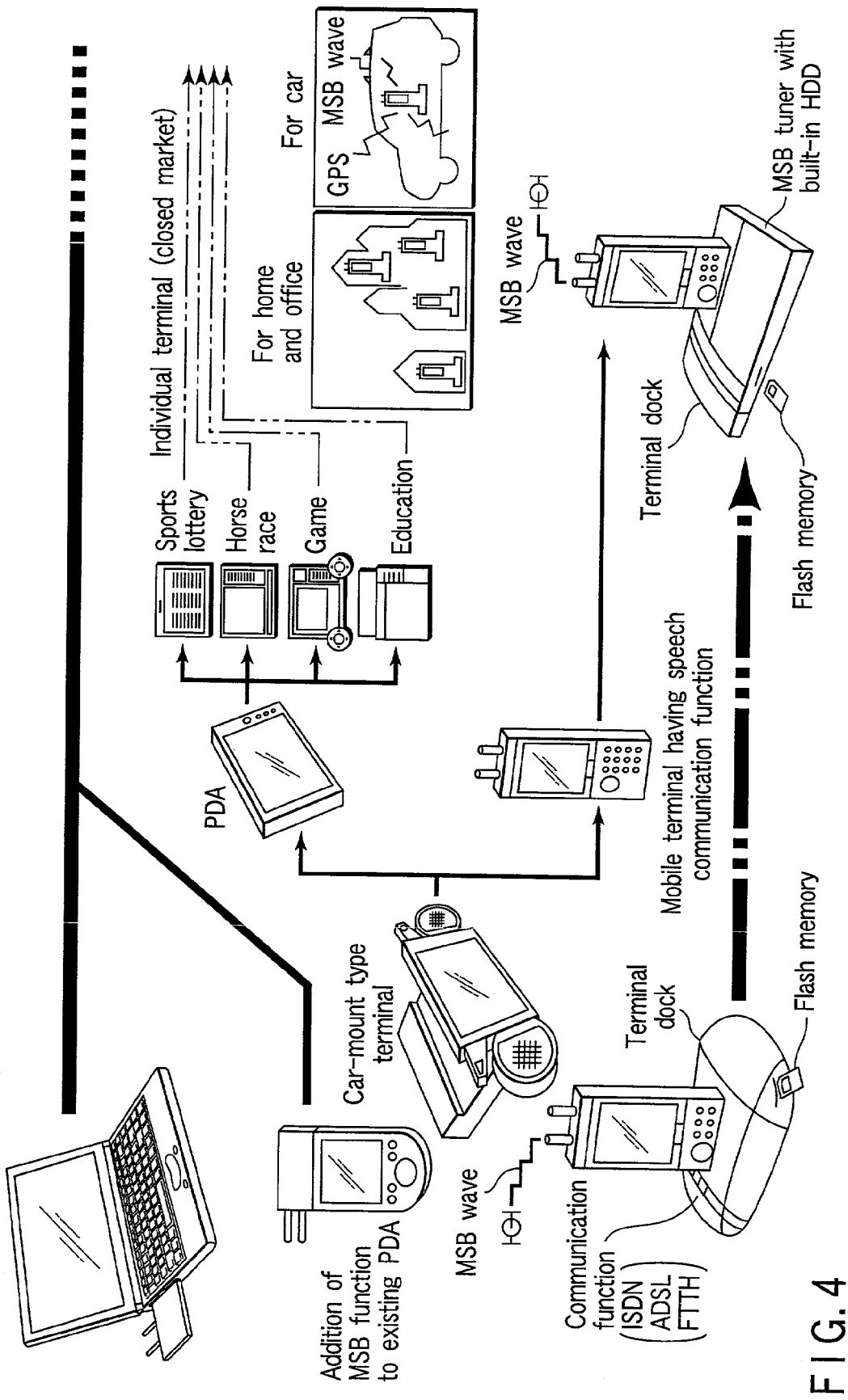
FIG. 4 is a conceptual diagram showing specification by mode of use of the receiving terminal device in the system.

FIG. 4 shows an example of specification of terminals by the mode of use in this system, and it is briefly explained below.

(1) An OS (operating system) or application is registered for MSB reception and reproduction by attaching an MSB wave receiving antenna to an existing PC (personal computer) or existing PDa (personal digital assistant).

(2) A car-mount terminal is detachable and usable as portable terminal.

(3) A dock (called terminal dock) is used, which is capable of charging an internal battery of terminal, recording and reproducing stored program data, and bridging by memory medium such as flash memory, by setting an exclusive receiving terminal. Basic functions of the terminal dock include charging function, data store by HDD and downloading function to terminal, mobile broadcast receiving function, server and Internet accessing function by connecting to communication line (ISDN, ASDL, FTTH, etc.), downloading function to memory media, and reproducing function by high performance speaker.

The store type contents may include sports lottery and horse race betting in closed circuit by individual terminals for home and office, and contents executing applications of game or education. For car-mount use, by combining with GPS and mobile phone, contents realizing use of information suited to car compartment environment may be also considered.

Figure 5:
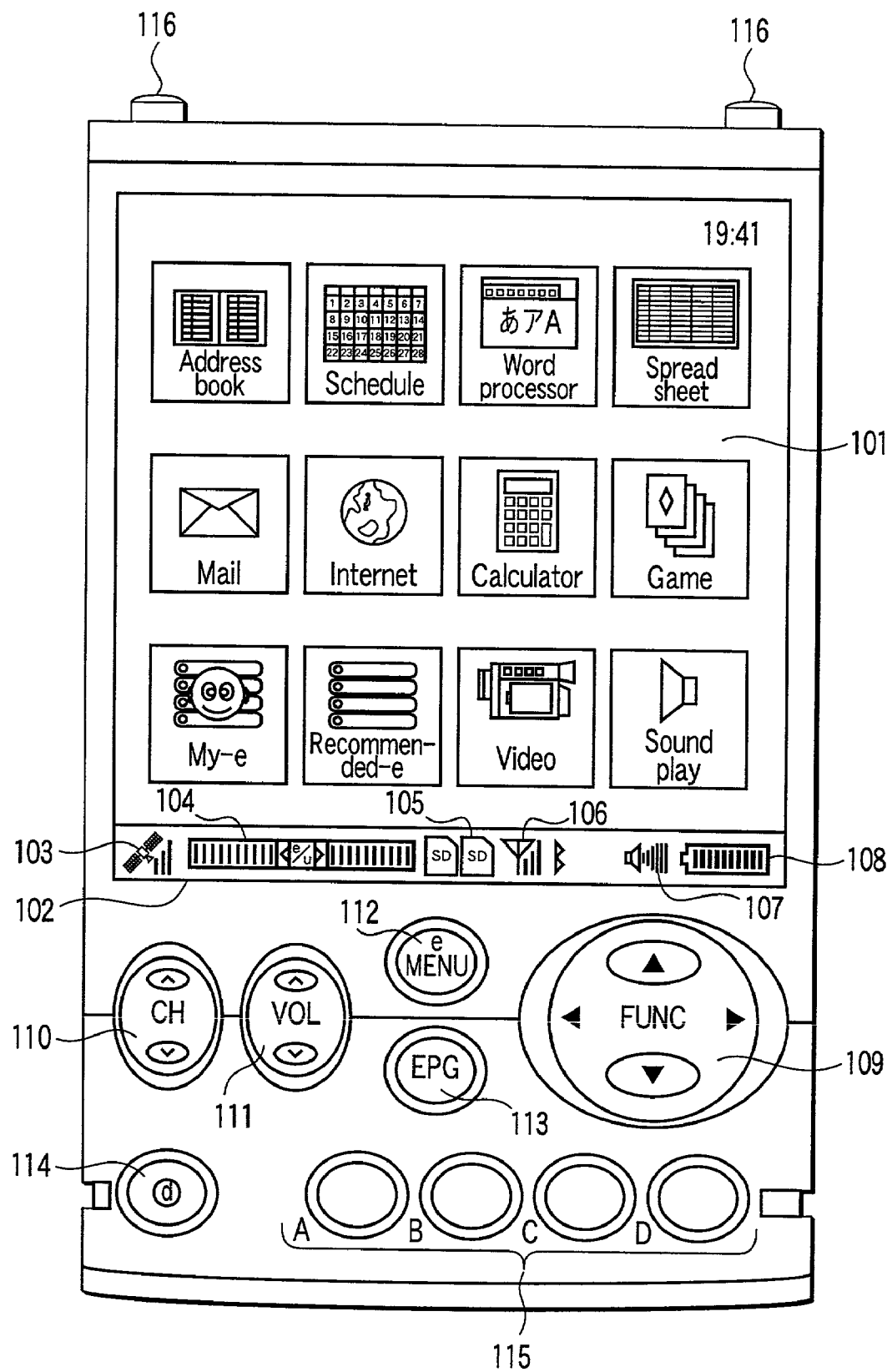
FIG. 5 is a diagram showing a specific configuration of a mobile receiving terminal device in the system.

FIG. 5 shows a specific configuration of mobile receiving terminal device used in this system. This mobile receiving terminal basically has the same function as the existing PDA, and further includes MSB receiving function and mobile phone function, and a receiving OS is incorporated.

In FIG. 5, reference numeral 101 is a liquid crystal display screen, and 102 is a sub display screen (LED with backlight), and the sub display screen comprises an MSB wave reception approval display unit 103, a receiving sensitivity display unit 104, a memory card insertion presence display unit 105, a mobile phone receiving sensitivity display unit 106, a sound volume display unit 107, and a battery level display unit 108. The operation unit comprises a select and execute button 109, a channel select button 110, a volume control button 111, a sub menu display button 112, an EPG (electronic program guide) button 113, a related program display button 114, and a select button 115 for blue (A), red (B), green (C) and yellow (D). On the top of the terminal, a pair of antennas 116 is disposed.

Several applications that can be realized by this system are specifically explained below.

(First Embodiment)

In a first embodiment, mobile broadcast service by multiple channels and multimedia realized by this system is explained.

Figure 6:
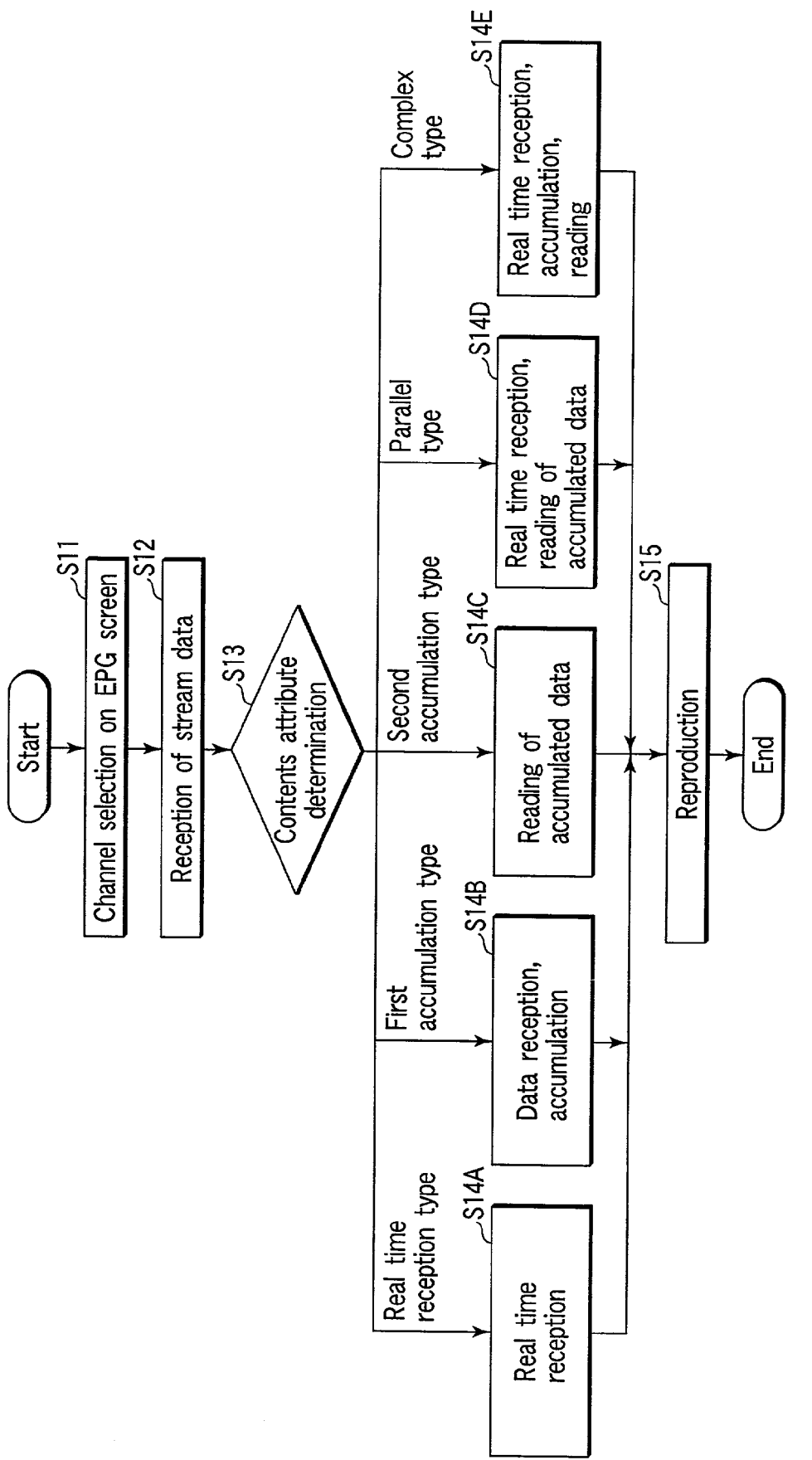
FIG. 6 is a flowchart showing flow of data processing by contents of broadcast in the system in a first embodiment of the present invention.
Figure 7:
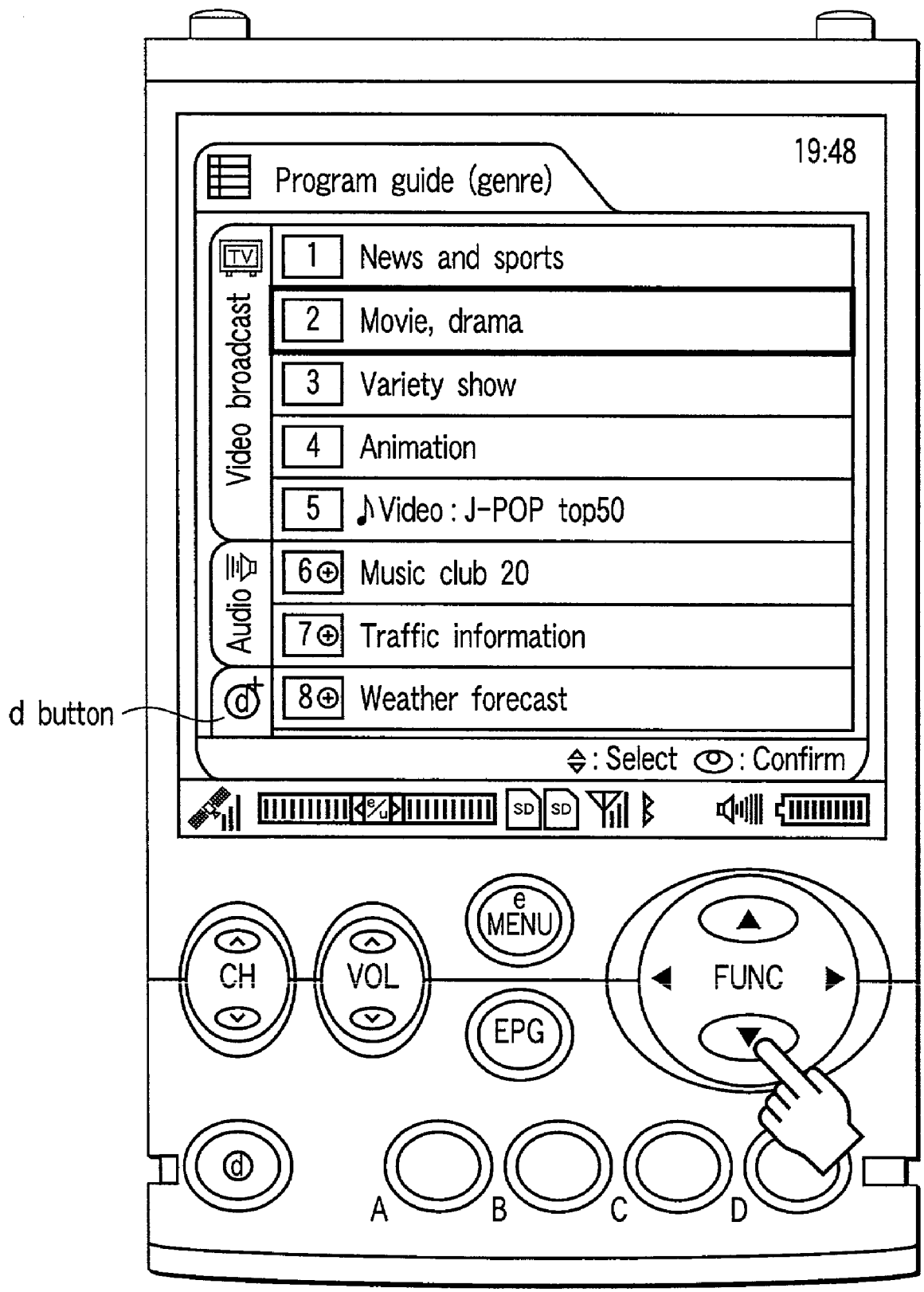
FIG. 7 is a diagram showing an example of an EPG screen displayed in the mobile receiving terminal device in the first embodiment.

FIG. 6 is a flowchart showing flow of data in reception and reproduction of mobile broadcast service in the receiving terminal device shown in FIG. 5. In FIG. 6, first, an EPG (electronic program guide) is displayed upon start. FIG. 7 shows an example of the EPG screen displayed in the receiving terminal device 40.

The user selects a desired content from the plural contents of multiple channels displayed on this EPG screen (step S11). The content is selected by moving the cursor to the desired content by up/down operation of the select and execute button 109 shown in FIG. 7, and pressing the decision button. The information presented by the content is multimedia information, which includes all of image data of moving picture or still picture, audio data, graphic data, and text data.

When the content is selected at step S11, the stream data relating to the selected content is received (step S12), and the data attribute is determined (step S13).

The data attribute of the content is explained. The contents displayed on the EPG screen are classified into a type received and reproduced in real time corresponding to the selecting operation (real time reception type), a type started to be received corresponding to the selecting operation, once stored in memory, and reproduced according to user's instruction (first store type), a type received automatically, stored in memory, and read out from memory and reproduced corresponding to the selecting operation (second store type), a type combining the real time reaction type and first or second store type (parallel type), and a type combining them arbitrarily (complex type). In particular, as a specific example of the parallel type, when the image data of the content of the first or second store type is reproduced, the audio data is received in real time parallel to the reproduction, and the content is reproduced as BGM.

At step S13, when the attribute of the content is determined to be real time reception type, the data from the satellite is received in real time (step S14A), and reproduced (step S15).

At step S13, when the attribute of the content is determined to be first store type, the data from the satellite is once received and stored (step S14B), and the stored data is read out and the content is reproduced (step S15).

At step S13, when the attribute of the content is determined to be second store type, the data stored in the memory is read out (step S14C), and the content is reproduced (step S15).

At step S13, when the attribute of the content is determined to be parallel type, the data from the satellite is received in real time, and further the data from the satellite is once received and stored of the data stored in the memory is read out (step S14D), and the content is reproduced (step S15).

At step S13, when the attribute of the content is determined to be complex type, the data is received in real time, and stored and read out appropriately (step S14E), and the content is reproduced (step S15).

Meanwhile, if the content is changed during or after reproduction of content, the process goes back to step S11, and the selected content is reproduced in the similar procedure.

In such configuration, the user can individually select a desired channel from plural channels, and view at a desired timing. At the contents providing side, by setting the contents providing form such as real time type or first or second store type depending on, for example, quantity of data, contents of adequate quality and high degree of freedom can be provided.

(Second Embodiment)

A second embodiment relates to contents preliminarily stored in the receiving terminal device of the system, in particular, to an application for reproducing the contents demanding reproduction permission information (so-called reproduction key) for viewing all information.

FIG. 8 is a flowchart showing an example of operation relating to reproduction of contents preliminarily stored in the internal memory in the receiving terminal device. In FIG. 8, the EPG screen of the contents stored in the internal memory is displayed (step S21). The contents stored in the internal memory are automatically updated by the downloading and storing function of the receiving terminal device. This function is explained in detail later.

When the user selects a desired channel (step S22), the content corresponding to the selected channel is reproduced (step S23). In the following explanation, it is supposed that the content selected at step S22 requires input of reproduction permission information (hereinafter referred to as "reproduction key") on the way in order to reproduce all of the information.

When reproduction of selected content is executed, in the midst of content reproduction, a screen urging input of reproduction key appears (step S24). Such content demanding reproduction key includes, for example, a pay program. In this case, for instance, guidance information such as "Use of pay content" is displayed to inform the user that it is a pay content, telling that input of reproduction key is necessary to view continuously.

The receiving terminal device, corresponding to the predetermined operation by the user, automatically accesses the server presenting a reproduction key (mobile broadcasting center providing mobile broadcast, or contents provider, etc.) through the mobile phone function, and acquires the reproduction key. In this manner, in the content demanding reproduction key, it is preferred to acquire the telephone number of the connection destination from the data upon start of reproduction, and access the server automatically according to the reproduction continue operation so as to acquire the reproduction key and execute the input process. However, when acquiring the reproduction key by other mobile phone than the receiving terminal device, it may be configured to enter the reproduction key separately.

As the method of collecting fee of pay contents, for example, the mobile broadcasting center processes according to the acquisition (purchase) of reproduction key, adds to the reception fee or the like, and collects from the user.

When the reproduction key is entered, returning to the content reproduction screen, the content can be viewed (step S25).

According to the contents providing service of the embodiment, by using the MSB wave, the contents desired by individual users can be provided independently.

Modified examples of this service include the following.

Not limited to pay contents, of course, free contents may be also used. For example, free video for advertising purpose, or free mini game (simple game of small quantity of data) for service purpose may be also provided. In this case, the flow in FIG. 8 is terminated at step S23.

Preferably, the receiving terminal device should incorporate an automatic filtering and storing function for automatically downloading the information corresponding to the desired channel in the MSB wave (that is, the information corresponding to a preliminarily selected channel) at specified timing, and storing in the internal memory (or hard disk in some case). In this automatic filtering and storing function, the information stored in the internal memory is periodically updated, and this updating is realized, for example, in four aspects.

In a first aspect, whether the channel stored in the memory is reproduced or not, the newly received channel information is always overwritten. According to this aspect, if the user does not operate particularly, the stored channel information in the memory is automatically updated to the latest contents.

In a second aspect, of the received channel information, only the channel information already reproduced in the memory is overwritten. By doing so, the individual data corresponding to the status of use by the user can be updated, and it prevents the accident of erasure of the un-reproduced channel information that is saved to be reproduced later by overwriting while the user does not know so that it cannot be reproduced. Moreover, the user can update the contents of the reproduced channel information to the latest contents without artificial operation.

In a third aspect, which channel information in the memory is to be overwritten is selected at every reception of MSB wave, for example, by the user in the interactive format. In this aspect, too, the individual data is updated depending on the status of use by the user, and it avoids the accident of erasure of the un-reproduced channel information that is saved to be reproduced later by overwriting while the user does not know so that it cannot be reproduced.

In a fourth aspect, without overwriting on the existing channel data, new information is stored as far as the memory capacity permits. In this case, a plurality of contents of past channel information can be saved, and can be selectively reproduced at a desired timing.

These examples are designed to select the channel information to be stored by using the automatic filtering and storing function of the receiving terminal device. By contrast, by registering the attributes preliminarily in the receiving terminal device, for example, on the basis of the individual information and classifying the information to be provided at the transmission side by each attribute, the information may be provided in a format that can be received only in the receiving terminal device having the specific attribute. For example, since the receiving terminal device is mostly used personally, an attribute "male in their twenties" may be registered in the receiving terminal device, and the transmission side provides information about "male in their twenties" by adding the identification data of this attribute, so that the information can be received and reproduced only in the receiving terminal device in which the corresponding attribute is registered. Such configuration is beneficial for distributing advertisement of merchandise aiming at a particular customer layer.

(Third Embodiment)

A third embodiment relates to an application of store of a secondary channel while a main channel is displayed and broadcast, in particular, when storing the provided contents in the internal memory in the receiving terminal device of this system.

Figure 9:
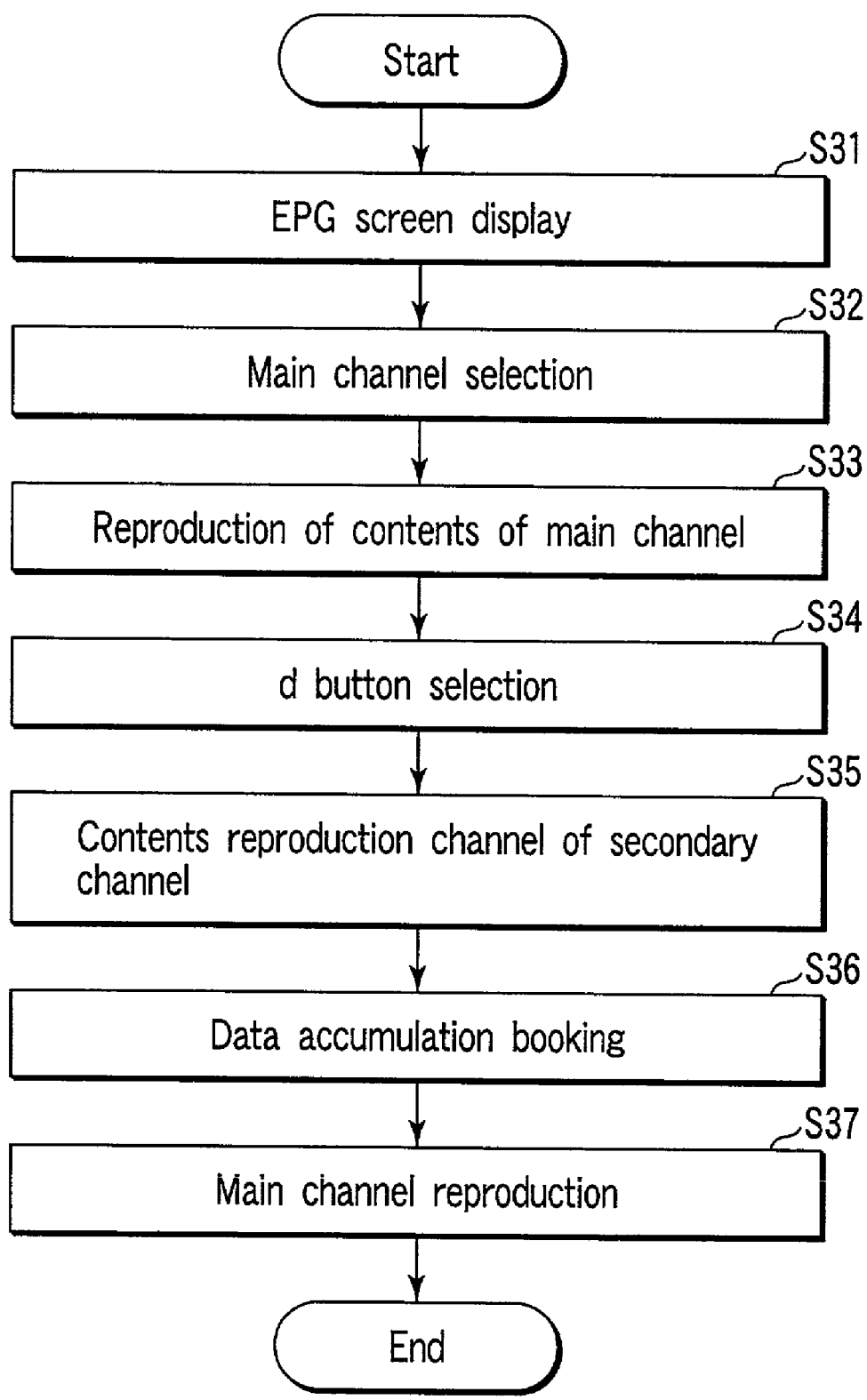
FIG. 9 is a flowchart showing a series of process from contents reception to contents store of an application executed in the receiving terminal device in a third embodiment of the present invention.

FIG. 9 is a flowchart showing a series of process from reception of contents to store of contents in the receiving terminal device. In FIG. 9, first, an EPG screen is displayed (step S31). When the user selects a desired channel from the EPG screen (step S32), the data relating to the select channel is acquired and the content is reproduced (step S33). Herein, the selected channel is a concept of a secondary channel. Acquisition of data at step S33 is executed by real time reception or the like depending on the type of the content provided by the selected channel.

Figure 10:
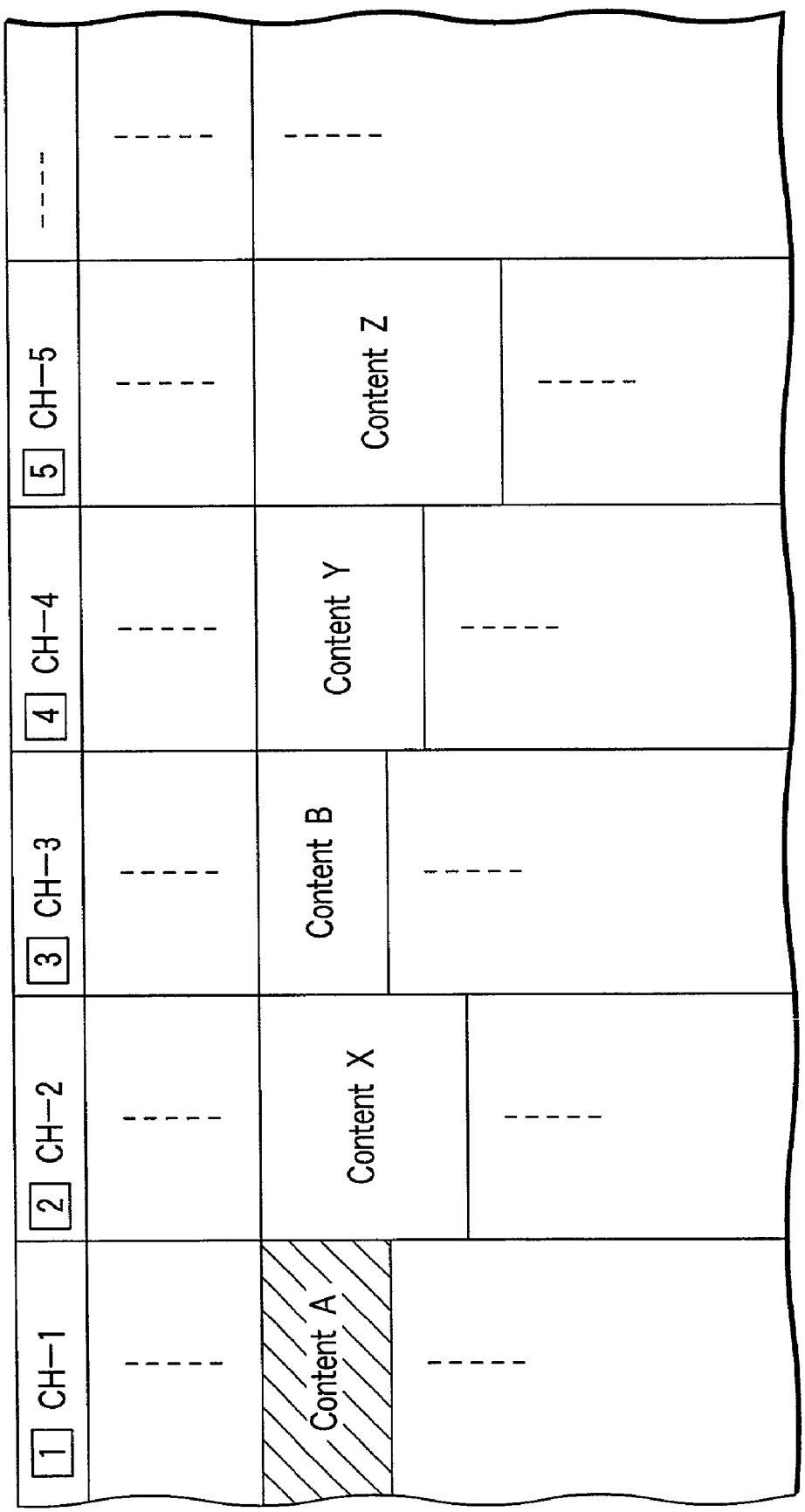
FIG. 10 is a diagram showing an example of a timetable of each program provided in each channel in the system in the third embodiment.

FIG. 10 shows an example of timetable of channel information to be provided. At step S32, it is assumed that the user selects content A at channel 1 shown in FIG. 10. In the same time zone, at channel 3, content B relating to content A (that is, secondary channel) is being on air. In this case, preferably, the display screen at step S33 should show the information that the secondary channel (content B) relating to the video channel being viewed at the present is on air, together with the video of content A.

Accordingly, as shown in FIG. 7, the display screen shows information of "button d" showing presence of secondary channel relating to the content of the displayed channel. By the display of this button d, the user easily knows that there is other channel providing desired information, aside from the displayed one. For example, by clicking the button d (step S34), by script or interrupt, the channel is changed from 1 to 3, and the content B of secondary channel is displayed (step S35). Meanwhile, similar process is done by pressing a relating program display button 114 of the receiving terminal device.

When changed to channel 3, the video of content B is displayed on the screen. The user can store or reserve to store the data of content B by specified operation (step S36). When store of content B thus set is completed, it is preferred to tell the user by audio or video means.

When process at step S36 is over, channel 3 is returned to the initial channel 1, and the user can continue to view content A (step S37). Or the user can reproduce and view content B whenever and wherever desired.

(Fourth Embodiment)

In mobile broadcast, contents can be shared and linked with other media by making use of features of digital broadcast. A fourth embodiment relates to an application of link of contents between mobile broadcast and other media. As a specific example, a novel contents providing method is proposed by merging broadcast and communication by linking contents of mobile broadcast and contents of Internet communication.

FIG. 11 is a flowchart showing a series of process from reception of contents of mobile broadcast to access to common contents provided on the Internet, executed by the receiving terminal device in this application.

In FIG. 11, first, an EPG screen is displayed (step S41). The user selects a desired channel from the displayed EPG screen (step S42). In this case, the selected channel is for providing contents linking with the Internet. The receiving terminal device receives the data of the selected Internet linking type contents (step S43). At this time, accompanying the data broadcast channel, URL data of Web page sharing the contents is also received.

The content is reproduced according to the received data, and the user can view the channel (step S44). Suppose the viewer is receiving and viewing contents relating to shopping displaying many catalogues. By turning page by page, when desired to access the Web site relating to the page of the contents of interest, the user operates as specified, and can access the desired Web site by making use of the mobile phone function of the receiving terminal device (step S45).

At the connected Web site, if the user desires, it is also possible to purchase on the Internet by the individual validation procedure explained below or the like (step S46).

Thus, by sharing and linking the contents between the mobile communication and other media, a new contents providing method can be realized. As a result, more information service can be provided to the users more easily and promptly.

(Fifth Embodiment)

A fifth embodiment relates to a contents providing method requiring individual validation, in particular, and an application of purchasing a horse race betting ticket from the receiving terminal device is explained. This application is realized by simultaneous multichannel receiving function of mobile broadcast and its always-storing function. Accordingly, it realizes the service capable of accessing the horse race information control centers operated across the nation in real time, purchasing pari-mutuel tickets, acquiring information of race results, and receiving the payoffs on the spot. The processing procedure is shown in FIG. 12.

Figure 12:
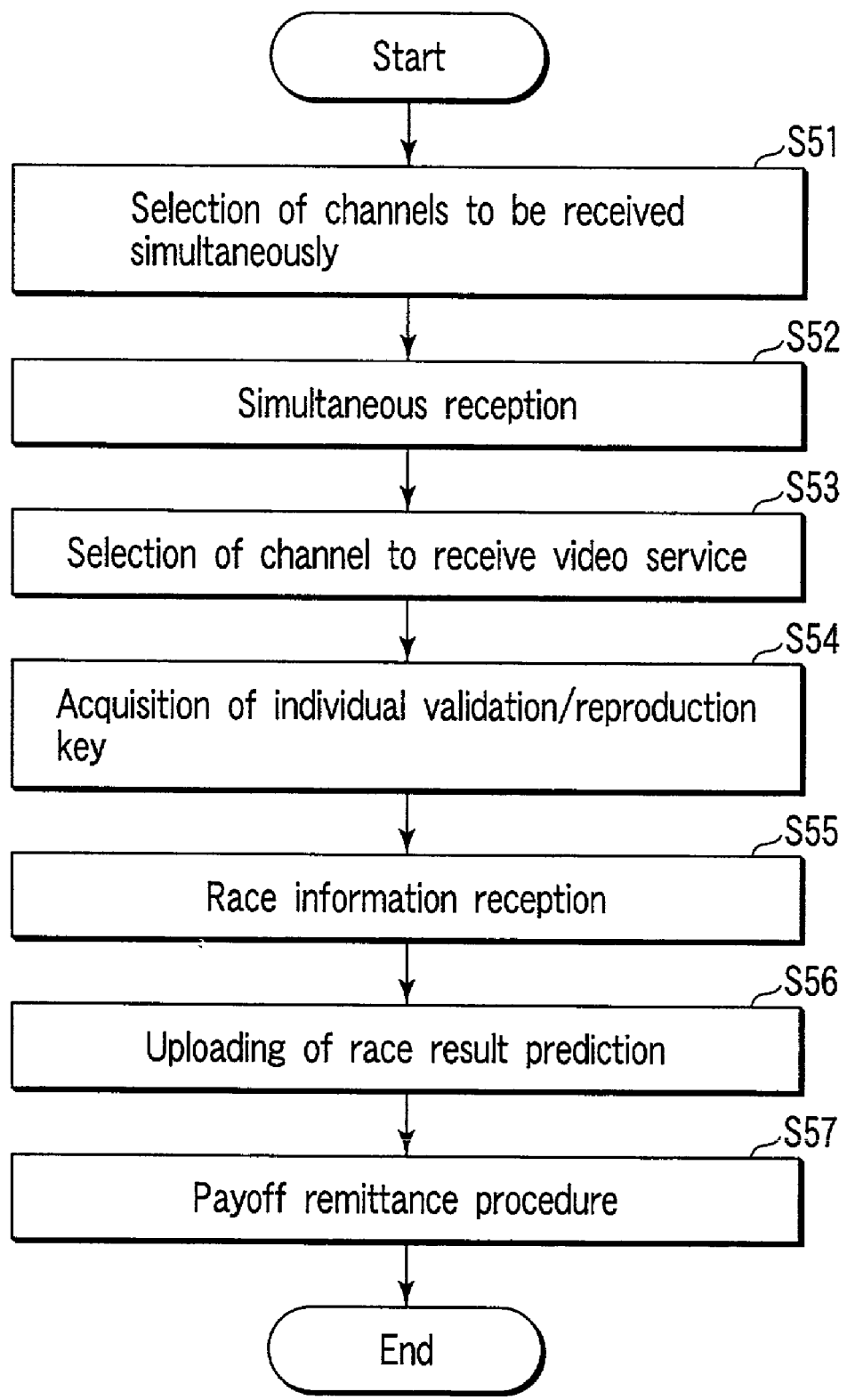
FIG. 12 is a flowchart showing procedure of process of an application executed in the receiving terminal device in a fifth embodiment of the present invention.

In FIG. 12, first by using numeric keys, receiving channels are selected by the simultaneous multichannel receiving function (step S51), and these channels are received simultaneously (step S52). At this time, samples of pari-mutuel tickets by mark sheets at local racecourses usable commonly in channels are also received simultaneously.

Of the received plural channels, the channel for receiving video service is selected and set (step S53).

Next, the user enters the security code, and completes the individual validation (step s54). Depending on the contents provided by the channel, it is required to identify the user by the individual validation. In such contents, preferably, at the step of progress, input of security code or the like is demanded, and the contents can be supplied only when the user is duly identified. The entered security code is transmitted to the broadcasting center or the like through the mobile phone function, and is registered and verified. When the user is validated at the center, the receiving terminal device receives the script file (reproduction key) from the server of the center, and the subsequent contents reproduction is started depending on the receiving and executing process.

Along with the progress of the contents, the receiving terminal device receives, stores and reproduces the race information (information of horses running for the race, betting information of each race, etc.) at selected specified race courses (step S55). At this time, when using samples of mark sheets received at step S52, from the viewpoint of convenience of users, it is preferred to display the samples having the race course names and race numbers already filled in according to the received race information. As a result, user's marking errors can be prevented.

Referring to the reproduced race information, the user enters the betting horse names in the single, double, or series competition system, and race result prediction in each category. The entered race result prediction is uploaded in the betting server, for example, through the Internet according to the stored program together with the data relating to the channel (step S56).

When betting on other race successively, the process of step S55 and step S56 is repeated.

After the race, the information of each race result is taken out in seamless sequence, and the race result and payoff can be checked. The user can remit the payoff to the bank through the Internet (step S57).

Thus, by providing the contents demanding individual validation, the user can receive the service safely at a desired time and in a desired place.

(Sixth Embodiment)

A sixth embodiment relates to an application for realizing interactive information provision executed by merging mobile broadcast and other media. Various forms may be considered as the interactive information providing service by using this system, and the following example is presentation of interactive education service by making use of the multichannel simultaneous receiving function, storing function and communication function in data broadcast of the receiving terminal device.

[Individual Learning]

Figure 13:
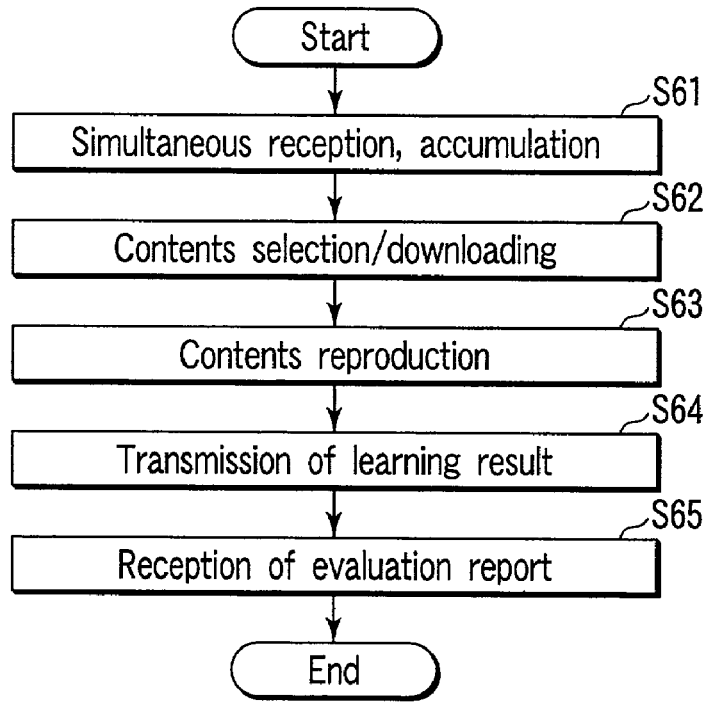
FIG. 13 is a flowchart showing flow of process executed as individual learning service in a sixth embodiment of the present invention.

FIG. 13 is a flowchart showing flow of process of an application executed in individual learning service. In FIG. 13, the receiving terminal device simultaneously receives plural education channels and stores in the memory by its multichannel simultaneous receiving function (step S61). Herein, the education channels are supposed to be curriculum data of different levels.

When the user selects the curriculum data suited to one's level from the stored plural education contents, the receiving terminal device downloads the educational material contents from the corresponding education channel depending on the selection (step S62). At this time, it is preferred to be configured so that special contents such as new contents or pay contents may be downloaded only after individual validation by input of security code.

The user can learn by reproducing the downloaded educational material contents in the receiving terminal device or other connected device (step S63).

The result learned by the user at step S63 is transmitted to the evaluation center through the Internet or the like by the communication function (mobile phone function) of the receiving terminal device (step S64), and scored and commented at the evaluation center, and an evaluation report is compiled, and transmitted to the receiving terminal device through the Internet. The user receives the evaluation report (step S65), and selects or purchases the education content corresponding to the evaluation, or accepts the education advice according to the evaluation.

[Mass Learning at School, etc.]

Figure 14:
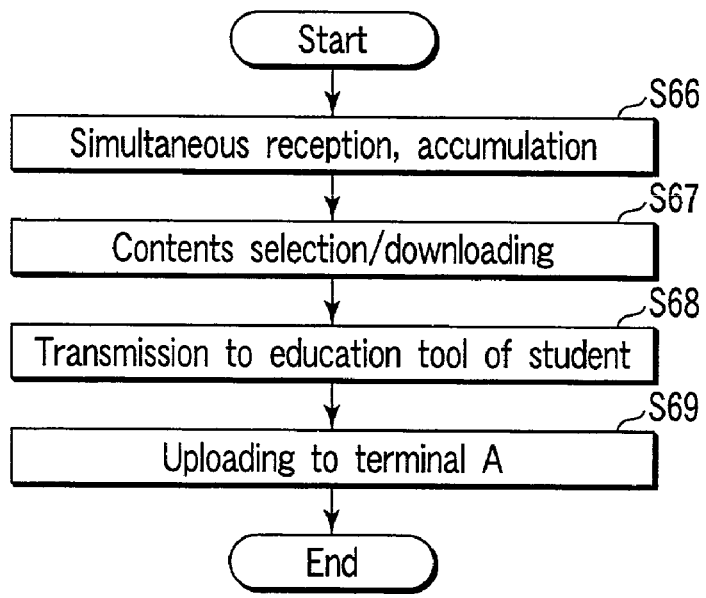
FIG. 14 is a flowchart showing flow of process executed as mass learning service such as school in the sixth embodiment.

FIG. 14 is a flowchart of the process executed in mass learning service at school, etc. In FIG. 14, the receiving terminal device simultaneously receives plural education channels and stores in the memory by its multichannel simultaneous receiving function (step S66). Herein, the education channels are supposed to be curriculum data of different levels.

When the user selects the curriculum data suited to one's level from the stored plural education contents, the receiving terminal device downloads the educational material contents from the corresponding education channel depending on the selection (step S67). At this time, depending on the characteristics of contents, it is preferred to be configured so that the contents may be downloaded only after individual validation.

The downloaded contents are distributed (transmitted) in batch to education tools (auxiliary tools) possessed by individual students that can communicate with the receiving terminal device possessed, for example, by the teacher. Using the education tools, the students individually learn and answer the questions (step S68).

When the students finish learning and answering the questions, the results are uploaded to the receiving terminal device of the teacher, and summation and individual evaluation reports are compiled on the spot (step S69).

The students select or purchase the education content corresponding to the individual report evaluation, or accept the education advice according to the evaluation.

Alternatively, answers or the like of students uploaded in the receiving terminal device may be transmitted to the evaluation center through the Internet by the communication function (mobile phone function) of the receiving terminal device. At the evaluation center, the evaluation reports to students are compiled, and the results are transmitted to the receiving terminal device through the Internet, so that more advanced education service may be provided.

This embodiment is an example of interactive education providing service. However, not limited to interactive manner, a sufficient educational effect can be expected by education information service by mobile broadcast only, and the industrial merit is also noted.

(Seventh Embodiment)

A seventh embodiment relates to a novel contents providing method realized by utilizing this system.

The contents providing method according to the embodiment is applied when providing the user with contents composed of moving picture and sound such as movie. That is, the contents composed of moving picture and sound such as movie are large in the quantity of information and are generally pay contents. If all of such contents are uniformly transmitted to all receiving end terminals, it takes too much time in transmission and it is not practicable. Further, whether to acquire such contents or not should be preferably selected freely by the user, for example, by viewing a sample preview and deciding whether or not to acquire the whole data.

In this application, in the case of a movie, for example, first stream data for reproducing the whole content of the movie (that is, complete moving picture and sound), and second stream data for excerpting and displaying several still pictures from the movie and reproducing the sound in synchronism with the still pictures (the sound may be either digested or complete) are provided individually. According to such providing method, information service can be provided, for example, by distributing free of charge the second stream data to general users as promotion contents, and transmitting the first stream data to the demanding users only after confirming individual validation and payment procedure.

Figure 15:
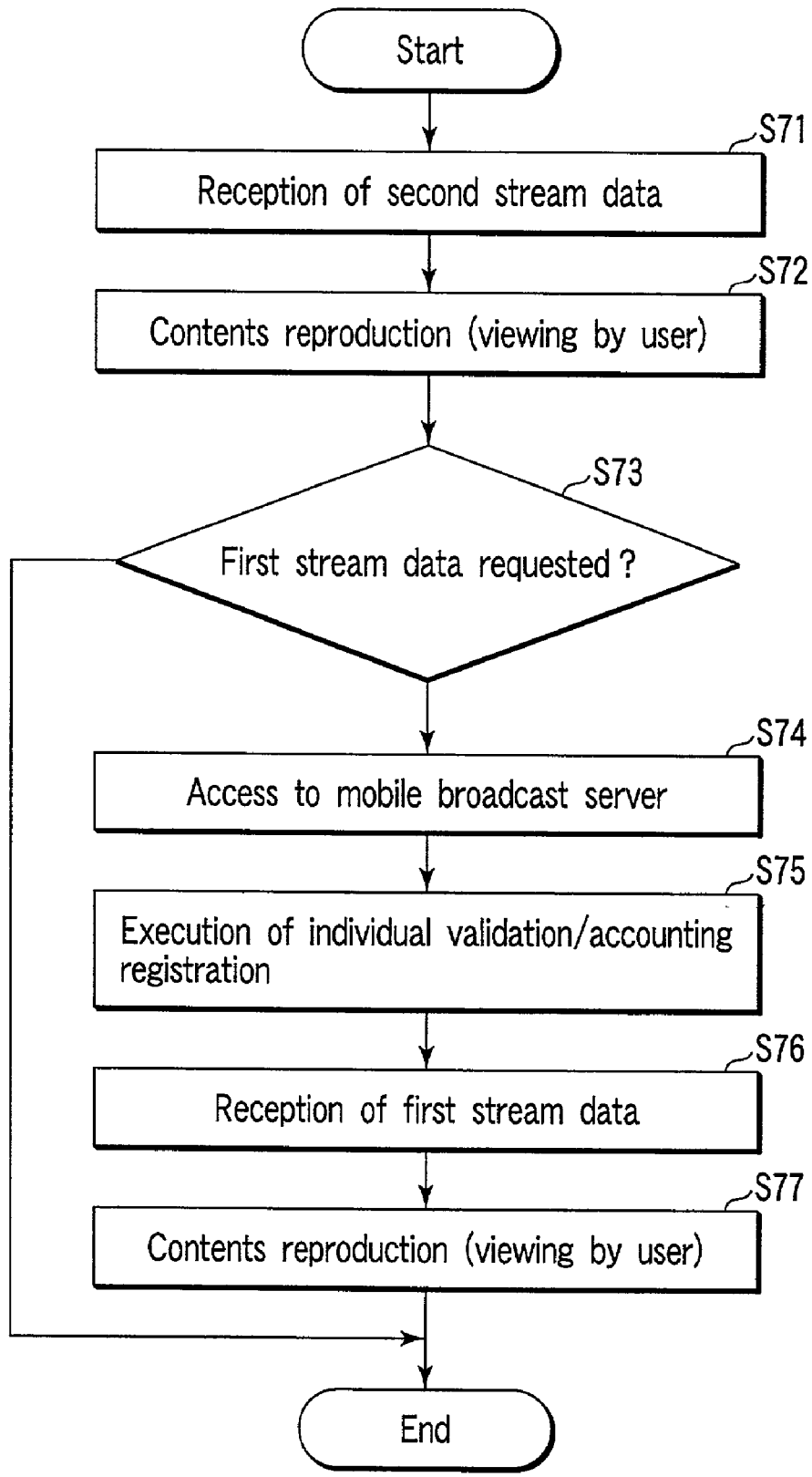
FIG. 15 is a flowchart for explaining a novel contents providing method realized by using this system in a seventh embodiment of the present invention.

FIG. 15 is a flowchart showing procedure at the receiving terminal device side of the contents providing method relating to this application. In FIG. 15, first, the receiving terminal device receives the second stream data distributed from the contents providing server broadcast wave from the satellite (step S71). This distribution of second stream data may be intended as arbitrary distribution, or intended as distribution to specific receiving terminal devices only assigned with the specific attribute. In the former case, the reception is controlled at the receiving terminal device side.

In the case that the first stream data and second stream data are transmitted by a same server, at the time of transmission, the server may automatically compile the second stream data from the first stream data. As a result, the data management may be unified.

When receiving the second stream data, in the receiving terminal device, the content provided by the second stream data is reproduced (step S72). This content is intended to promote the movie or curtail the quantity of transmission data, and is not intended to reproduce the complete content. In the case of a movie, the sound may be reproduced completely, while the still pictures are displayed, for example, at 10-second intervals in synchronism with the sound like a still shadow play.

When the content provided by the second stream data is viewed, and the user judges whether or not to demand the first stream data for reproducing the complete content (step S73). If the first stream data is not demanded, that is, if the user does not wish to view the complete version of the movie, this service is terminated on the spot.

On the other hand, if desired to view the complete content by acquiring the first stream data, the mobile broadcasting center is accessed by the communication function of the receiving terminal device (step S74), and the procedure for acquiring the first steam data is executed (step S75). This procedure includes, for example, the individual validation for distributing the first stream data to specific users only, and payment registration for distributing the first stream data only to the users completing the specified fee payment procedure.

When the individual validation at step S75 is completed, the first stream data is transmitted to the receiving terminal device (step S76), and the user can view the complete content. The first stream data may be transmitted to the receiving terminal device through the communication line or, instead, a removable recording medium may be presented to the user side by shipping or transportation. Or the first stream data may be provided to the user as the pay channel by means of mobile broadcasting network.

The first stream data is generally large in quantity of data, and by attaching a terminal to a terminal dock, the first stream data may be stored in the terminal dock. The reception timing of the first stream data is not limited to step S76, but it may be received together with the second stream data at step S71, for example, so as to be reproduced by receiving a script file by individual validation at step S75.

In this embodiment, when viewing the complete content at the terminal after viewing the second stream data, it is configured to acquire the first stream data after a specified procedure. But, not limited to this, after receiving the content providing service by the second stream data, for example, several compositions may be configured as follows.

First, depending on the users, some may prefer to see the movie on a large screen of a cinema instead of the terminal. In such a case, after viewing the second stream data, if desired, the user may access the ticket-booking center by the mobile phone function of the terminal and purchase a ticket of the film through the terminal. For example, by providing the contents including viewing of digested version by the second stream data and interactive purchase of ticket, a more sophisticated service may be presented to the users.

Secondly, some users may prefer to view the complete content by the home video system. In such a case, by a specified procedure to the service center from the terminal, it may be configured to be transmitted to the home computer by the Internet. Or by using a shipping system, a removable memory medium such as DVD may be directly mailed to the user's home.

The image presented by the second stream data is not limited to still pictures alone considering from its purpose. The method of compression used in this application is assumed to be, for example, MPEG. By utilizing the characteristics of the MPEG, the composition of the second stream data may be modified, for example, as follows.

Firstly, the second stream data may be composed of video data reproduced by I image and B image, and audio data reproduced in synchronism with the video data, and the first stream data may be composed of video data and audio data for reproducing the complete content of the movie.

Figure 16:
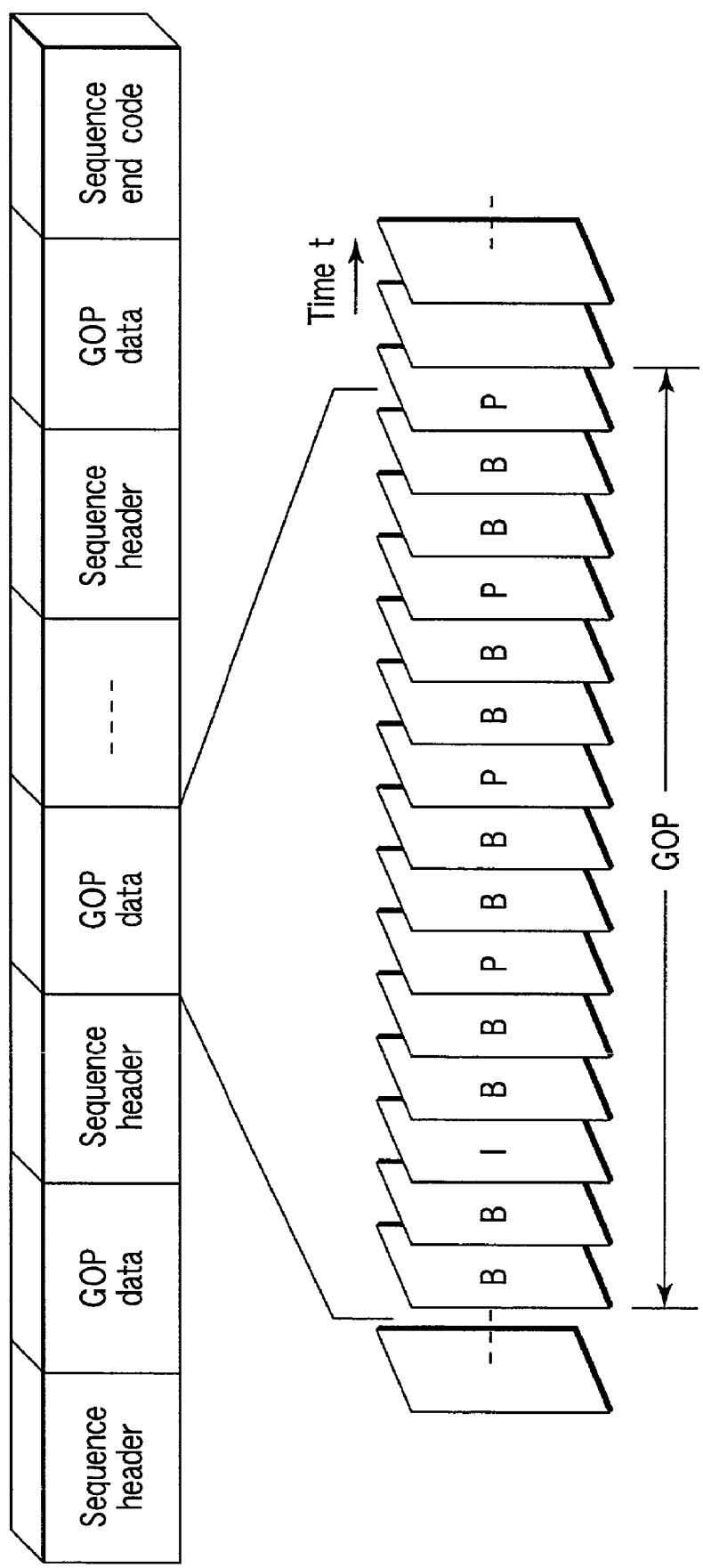
FIG. 16 is a conceptual diagram for explaining a modified example of composition of second stream data in the seventh embodiment.

Second, instead of classification into I image, B image and P image, the extracted GOP (group of picture) may be composed of video data of second stream data. That is, as shown in FIG. 16, the second stream data may be composed of the GOP extracted in a specific period.

Figure 17:
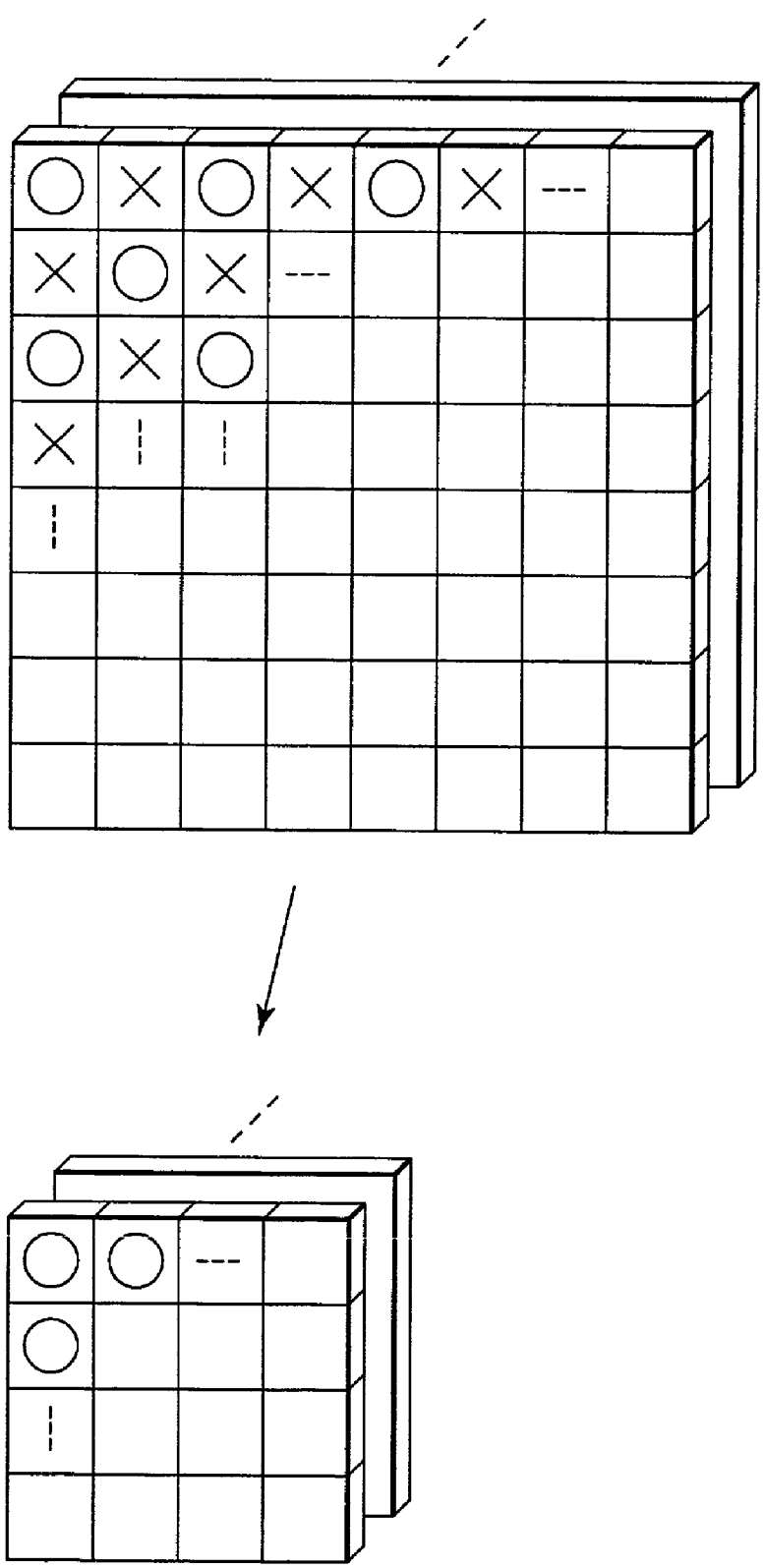
FIG. 17 is a conceptual diagram for explaining a modified example of the composition of the second stream data in the seventh embodiment.

Besides, as shown in FIG. 17, for example, in one image, every other pixel is allotted, and a first image and a second image are compiled from each full image, and a first image group may be composed from the first image relating to each full image, and a second image group from the second image relating to each full image. Besides, for example, every other scanning line may be allotted, and a first image and a second image may be compiled from each full image. Anyway, the information for reproducing the full image from the first image and second image must be transmitted together with the image.

This has been the explanation of the application of providing contents by making use of this system. However, the technical concept of this contents providing method is not limited to the mobile broadcasting network, but may be realized by the existing infrastructure such as BS broadcast, CS broadcast, ground wave broadcast, or Internet.

By such information providing service, for example, the contents providers can distribute the second stream data of small quantity of data for promotion purpose. Therefore, the advertising cost necessary for promotion may be curtailed. Moreover, distribution of stream data by mobile broadcast will realize prompt, easy, and wide-range promotion.

For the user, further, after viewing the second stream data, the first stream data for reproducing the complete content can be received, and therefore the time and memory resources may not be spent for reception of unnecessary data. At the same time, the user has an extended degree of freedom for selecting information providing service.

(Eighth Embodiment)

An outline of a data broadcasting system utilizing mobile broadcasting satellite in an eighth embodiment (herein called mobile satellite broadcasting system) is explained.

FIG. 18 is a block diagram showing this system configuration. This mobile satellite broadcasting system receives broadcast waves sent out from a mobile broadcasting station 100 by a mobile broadcasting satellite 200, and transmits to a specified service area (throughout Japan). A mobile receiving terminal device (hereinafter referred to as "mobile receiving terminal") 300 for receiving the MSB waves transmitted from the mobile broadcasting satellite 200 can be connected to a mobile phone 400 (or may be integrated), and is accessible to an Internet service provider 500 through this mobile phone.

The mobile broadcasting station 100 receives program information compiled and edited by plural program providers, multiplexes each program information into channels, converts into broadcast signals, and transmits to the mobile broadcasting satellite 200 through an uplink of, for example, Ku band (12.5 to 18 GHz). The channel multiplex method is CDM (code division multiplex) system.

The mobile broadcast satellite 200, receiving the Ku band broadcast signals, converts into S band signals by a transponder. The converted S band broadcast signals are transmitted to the service area. By distributing broadcast waves in such high frequency band, MSB waves can be received by a relatively small antenna. This merit contributes to downsizing of mobile receiving terminal 300.

In this embodiment, as other infrastructure, an example of CS satellite broadcast is explained. In FIG. 18, the broadcast wave transmitted from a CS broadcasting station 600 is transmitted throughout Japan by way of a CS broadcasting satellite 700. At a CS subscriber's home 800, the CS wave is received by a CS antenna 810, and can be received and reproduced by a CS receiver 820.

At this CS subscriber's home 800, by setting the mobile receiving terminal 300 to the interface, a data storage control device (herein called store dock) 900 managing the stored data at the terminal 300 is prepared. This store dock 900 incorporates, for example, a large capacity memory medium such as hard disk, takes in the stored data from the terminal 300 and stores in the memory medium, and presents the stored data to the terminal 300 whenever requested. The store dock 900 can also access the Internet service provider 500 through a telephone line, or can be connected to the CS receiver 820 through an IEEE1394 network, so that the CS broadcast program can be booked and recorded.

Herein, the mobile satellite broadcast is mainly transmitted to mobile units and portable terminals. Accordingly, considering from the terminal store capacity and battery capacity, it is not realistic to download a large quantity of data for viewing programs. In particular, the mobile satellite broadcast is extremely low in data transmission rate as compared with the CS satellite broadcast. Accordingly, if the mobile satellite broadcast and CS satellite broadcast can be combined, it is beneficial for the viewers because information acquisition and viewing can be separately realized. As an aspect of such mode, an example of broadcasting brief information by mobile satellite broadcast, and broadcasting detail information by CS satellite broadcast is specifically explained below.

In the system in FIG. 18, from a data provider (contents providing server) 1000, brief information is distributed to the mobile satellite broadcasting station 100, and detail information is distributed to the CS broadcasting station 600, and these broadcast waves are supplied to the mobile receiving terminal 300 and CS receiver 820. The detail information is also distributed to the Internet provider 500 and information providing devices 100 installed at convenience stores (hereinafter referred to simply as convenience stores). In the case of pay detail information, the data provider 1000, Internet service provider 500, and convenience store 1100 are linked to an electronic settling system 1200, so that the fee can be charged when downloading the detail information.

In this system configuration, after viewing the brief information at the mobile receiving terminal 300, if desired to view the detail information, the following acquiring method may be devised.

As the brief information, for example, supposing the detail information to be full motion image, the latest portion of the store type content, or the decimated image or still picture curtailed in quantity is transmitted.

When viewing the brief information while going out, if wishing to view the detail information on the spot, the user accesses the Internet service provider 500 through the mobile phone 400, and downloads the detail information from the server. To save the communication charge, the user goes to a local convenience store 1100, and accesses the server already receiving the detail information installed at the store through wireless LAN or the like, and downloads the detail information. To view later, accessing the store dock 900 via the Internet through the mobile phone 400, the detail information of the CS broadcast is downloaded from the CS receiver 820, and by loading the mobile receiving terminal 300 into the store dock 900 after returning home, the detail information can be acquired and viewed.

Further, specific examples are explained below.

EXAMPLE 1

Figure 19:
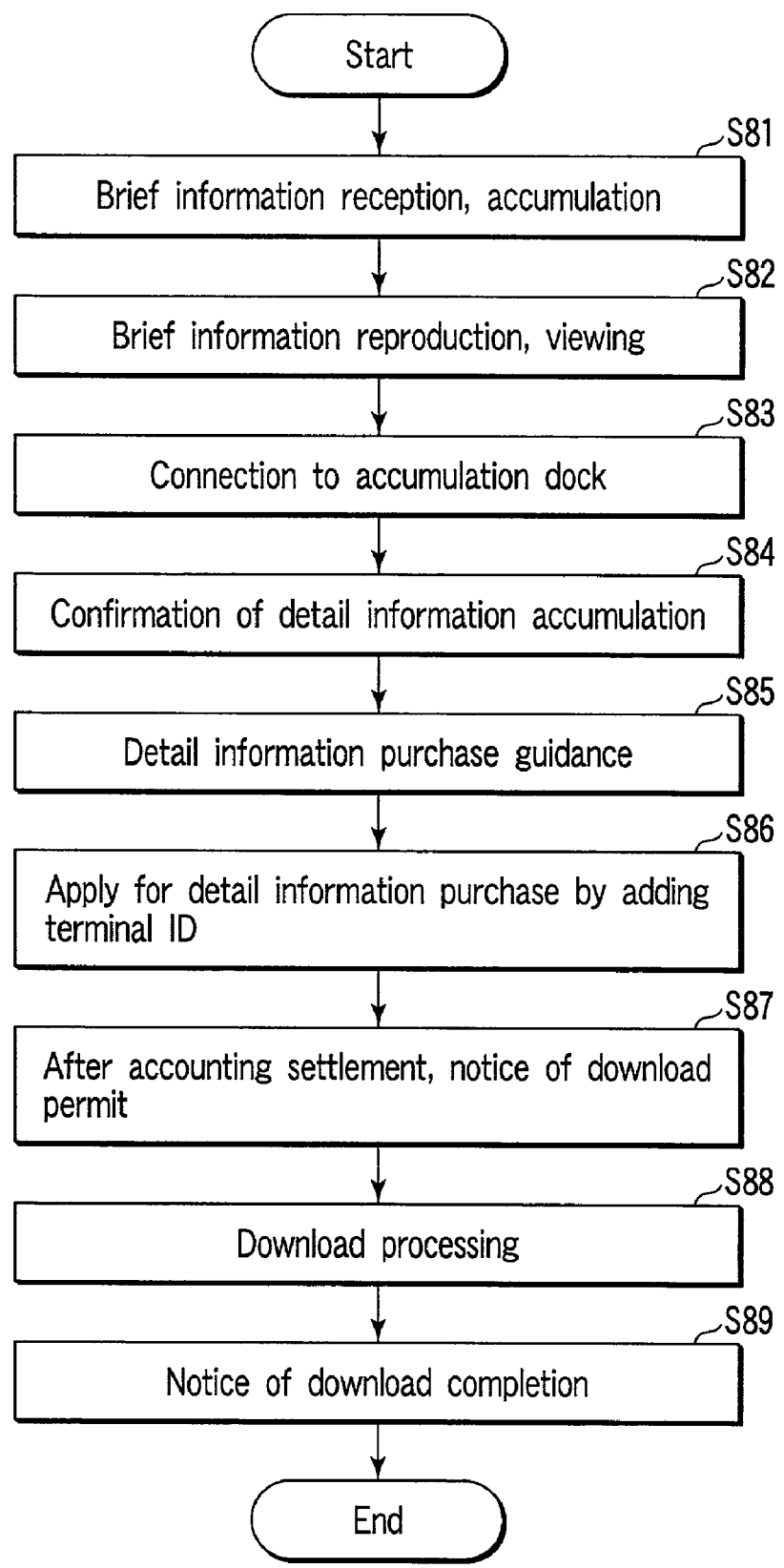
FIG. 19 is a flowchart showing flow of process of purchasing and acquiring pay detail information by using a mobile receiving terminal device and a store dock in the eighth embodiment.

FIG. 19 is a flowchart of a first example showing flow of process in the case of purchasing and acquiring pay detail information by using the store dock 900 at the mobile receiving terminal 300.

First, at the mobile receiving terminal 300, MSB waves are received, and free brief information is received and stored. At this time, if detail information is already present, the user judges to replace the information (step S81).

After storing brief information, the brief information is reproduced at the mobile receiving terminal 300, and the program is viewed (step S82).

After returning home, when the user connects the mobile receiving terminal 300 to the store dock 900 (step S83), the terminal 300 automatically accesses the store dock 900 and checks if detail information is stored in the store dock 900 or not (step S84). If stored, a message "There is detail information. Do you purchase?" is displayed or sound guidance is delivered (step S85).

When the user desires to purchase by specified operation, the mobile receiving terminal 300 notices the terminal ID and detail information purchase offer to the data provider 1000 through the Internet (step S86). At this time, the data provider 1000 notices a fee charge occurrence to the settling firm, and receives a permit note from the settling firm, and notices a download permit to the mobile receiving terminal 300 through the Internet (step S87).

Receiving the download permit notice, the mobile receiving terminal 300 confirms the detail information stored in the storage region of the store dock 900, and downloads the differential information from the already stored brief information (step S88). After completion of downloading, the user is informed that it is ready to reproduce the detail information (step S89). Thereafter, the stored detail program can be viewed whenever desired.

EXAMPLE 2

Figure 20:
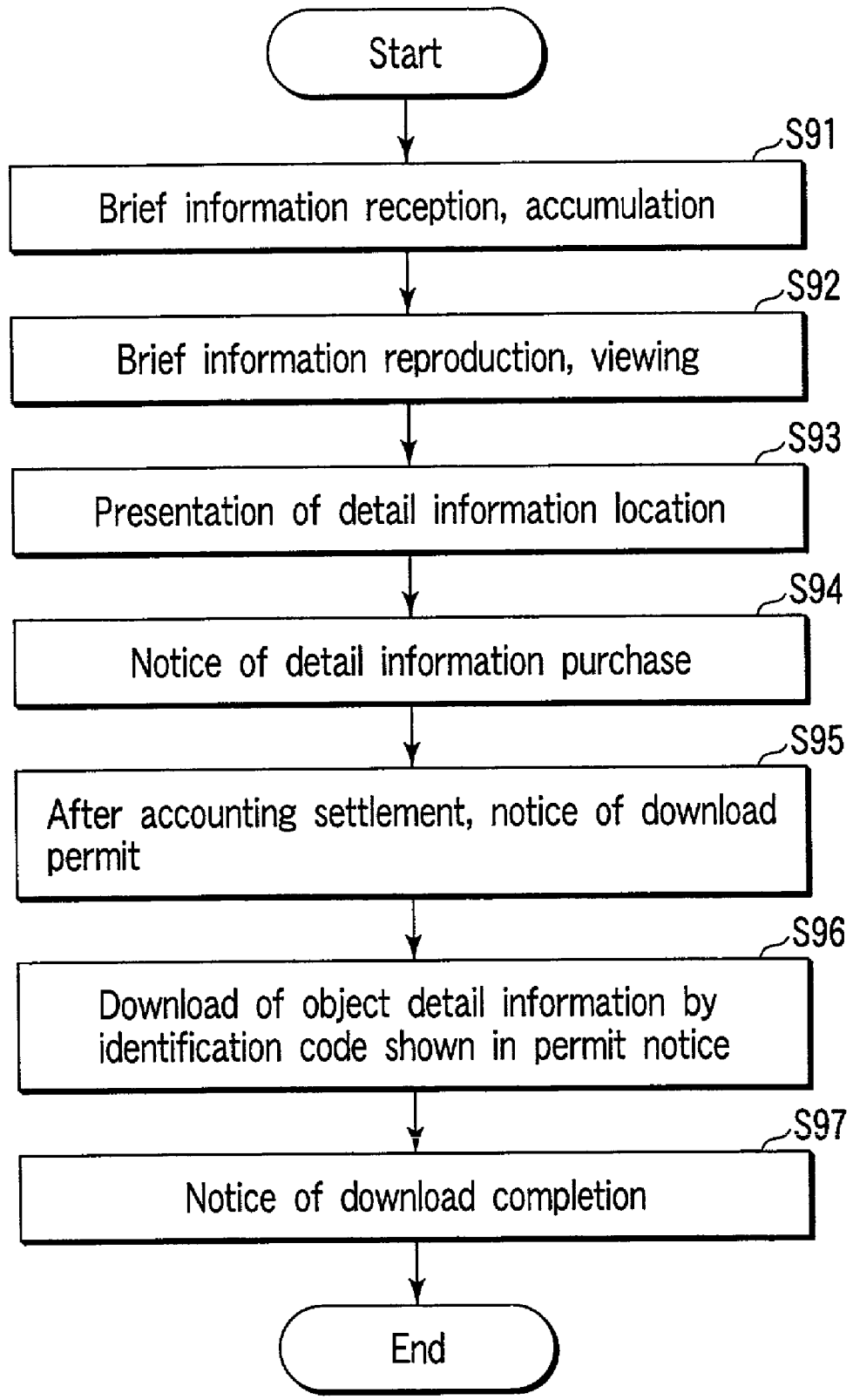
FIG. 20 is a flowchart showing flow of process of purchasing and acquiring pay detail information through the Internet by using a mobile receiving terminal device in the eighth embodiment.

FIG. 20 is a flowchart of a second example showing flow of process in the case of purchasing and acquiring pay detail information through the Internet at the mobile receiving terminal 300.

First, at the mobile receiving terminal 300, MSB waves are received, and free brief information is received and stored. At this time, if detail information is already present, the user judges to replace the information (step S91).

After storing brief information, the brief information is reproduced at the mobile receiving terminal 300 and the program is viewed (step S92). At this time, when reproducing the brief information, the user is informed on the presence of detail information and the address such as home page as its location (step S93). When the user desires to purchase by specified operation, the mobile receiving terminal 300 connects to the Internet service provider 500 through the mobile phone 400, and connects to the information provider through the Internet, the notices the purchase of detail information (step S94). At this time, the information provider informs the settling firm of the information purchase to cause fee charge, and notices a download permit to the terminal 300 (step S95).

Receiving the download permit notice, the mobile receiving terminal 300 accesses the information provider by using an identification code shown in the permit notice, and downloads the desired detail information (or differential information from brief information) (step S96). After completion of downloading, the user is informed that it is ready to reproduce the detail information (step S97). Thereafter, the stored detail program can be viewed whenever desired.

According to these specific examples, even in the data broadcast of narrow band, seeing that simple contents "for the time being" can be distributed, it adds to the chance of purchase of contents broadcast in the CS of broadband or the Internet. Moreover, since the latest information portion is transmitted from the MSB waves "for the time being", the data can be updated all the time. When a main unit for connection is installed at a convenience store, the detail information can be stored before returning home from work, and it is very convenient.

When realizing such application, at the time of downloading the information in the terminal through MSB wave, it is helpful to build up a database describing the information in each file, such as the information to be used permanently or not, or whether brief or detail is the information presently own in the terminal in the program having the detail information. Accordingly, an identification signal for building up the database is superposed on the MSB wave. A similar signal is superposed at the broadband side.

At the terminal, preferably, a button for confirming whether the user desires more specific information or not should be provided. Or when receiving the MSB wave data again, in order to release the memory, a button inquiring whether or not to discard the detail data is provided, so that the convenience is further enhanced.

Further, complicated operation procedure can be omitted by configuring to replace with detail information fully automatically only by putting the terminal on the main unit (store dock).

Moreover, when configured to replace all information of the terminal with the latest information when connected to the broadband (CS, Internet), the latest information can be viewed from the terminal whenever and wherever desired.

By allowing to view by using the key word or terminal ID, when designed to manage and validate at the information center, an application is considered to permit downloading only at a specified terminal from next time as far as the information is the same.

When the terminal has an agent function, the synopsis or full text of necessary information can be downloaded from the broadband on the basis of the user's preference information, or when the probability of preference database is enhanced by synchronizing the preference information with the main unit, it is more effective.

Specific examples of data broadcasting system of the invention are listed below.

When broadcasting promotion video of movie or the like, the sound is delivered directly, and still pictures of important scenes of the moving picture are displayed in synchronism with the sound. As a result, the data capacity of one work is saved, and more contents can be transmitted.

The dock to be charged by accommodating a mobile receiving terminal is provided with a recording medium such as hard disk, and stored data is saved in the receiving terminal, so that the saved data is presented to the linked receiving terminal according to the request. Further, when a function to receive data broadcast is provided, booking of recording is also possible.

When the receiving terminal device is of mobile unit mount type to be mounted on a dashboard of an automobile, for example, it can be detached from the mobile unit, and can be used alone, so that it may be very convenient.

The receiving terminal device incorporates an application for managing personal control information as portable terminal. It upgrades the terminal utility of the user.

The receiving terminal device has a function of exchanging data with bridge media. As a result, the data storage control is facilitated.

In order to receive this data broadcast by an existing information processing device such as PC or PDA, a data broadcast receiving antenna device of card slot loading type as external interface is presented, and also a program (software) for assembling it into the information processing device for reproducing and presenting the data broadcast receiving contents is presented.

Specific applications of data broadcast (mobile broadcast) of the invention are explained below.

(1) Education Program by Mobile Broadcast

<At Home>

(i) When learning by mobile broadcast education program, desired contents can be purchased at the receiving terminal device of mobile broadcast. Contents may be either downloaded in the receiving terminal device, or distributed to home by ordinary e-commerce.

(ii) Possible to learn by learning pad (education tool) and text (like ordinary picture book). When results of learning (answers to questions) are uploaded to the server through the receiving terminal device, an evaluation report (with rank and measures) is compiled at the server side, and the information is sent back as image data, or received by the facsimile function of the receiving terminal device.

(iii) Customized contents (texts, etc.) can be purchased by using the communication function of the receiving terminal device. Or they can be downloaded in the receiving terminal device or printed by the facsimile function.

<At School>

(i) Contents (texts) can be distributed in batch by using the receiving terminal device.

(ii) Students individual learn by the learning pad, and answer the questions, and answers are uploaded to the server through the receiving terminal device.

(iii) The teacher uploads the learning results to the receiving terminal device. As a result, the students can look up the own learning result whenever desired.

(iv) Since the answers are updated to the server from each receiving terminal device, the results can be summed up and evaluated instantly.

(v) It can be utilized in purchase of educational materials.

<On Travel>

(i) During summer vacation, the education program can be viewed wherever one goes.

(ii) The daytime programs can be stored, and reproduced and learned at night.

<Corporate Education>

(i) Enterprise activities are possible as SFA. The account-settling program can view by personal receiving terminal device.

<Elderly People Care and Welfare>

(i) The receiving terminal device can be used in rehabilitation such as speech therapy.

(ii) Personal use in hospital room is possible, without annoying room mates.

(2) Business Use by Mobile Broadcast

The stock price can be checked all day by a stock channel (a stock market program).

(3) Commercial Use by Mobile Broadcast (i) By broadcasting theme park programs (Disneyland channel, Universal Studio channel), receiving terminal devices are leased to theme park visitors with or without charge, so that today's attraction or other guides can be sequentially retrieved from the stored data. It can be also used as navigation function when lost. For example, children carry sub units, and when a child is lost, the parent can speak to the sub unit from the receiving terminal device by the communication function, or the location of the child can be known by the radio wave transmitted from the sub unit.

Or each employee of the theme park carries one receiving terminal device, so that the job manual can be checked whenever necessary, or that the employees can reply inquiries of visitors on the spot.

(ii) The receiving terminal device is placed on each table in a shop, and the customer can view a desired program freely and privately, so that the quality of coffee shop may be enhanced.

(iii) On the back of the seat in airplane or train, the receiving terminal device is installed instead of the liquid crystal TV.

(4) Tour Guide Program "Around the World"

(i) The program introduces traveling tours. Preferably, both existing traveling agency tour guide and original tours should be provided. In particular, the information program is edited to meet needs of viewers by presenting information not found in the existing guidebooks, such as specific hotels, required time, and expenses.

(5) Use as Portable Terminal (i) Use of function wherever and whenever

Usable while traveling, in resort hotel, camping site, or car. For example, it is considered to be used in car navigation function+station navigation function, airplane navigation (route, fare, time table, etc.) function, retrieval function at theme park, event and sightseeing spot, waiting time, and idle time at night.

(ii) Two-way function

The tour introduced in mobile broadcast is ordered from the receiving terminal device. For example, by entering the desired place, hotel and schedule in the receiving terminal device, it automatically accesses the travel agency, and terminates the application procedure. By auction with the travel agencies subscribing with the broadcasting station, the price and service are presented to the client. The client selects the best choice of tours and files an application through the receiving terminal device. Using the travel retrieval function, by entering the desired place and schedule in the receiving terminal device, various courses can be searched.

(6) Business Model Proposal by Mobile Broadcast (i) Two-way sports lottery system using mobile broadcast Sports lot can be purchased whenever and wherever by using the two-way communication system of mobile broadcast. The IC card incorporates functions of personal data (name, address, account number, etc.), point card, etc. The IC card is provided with a personal code. This IC card is used for individual validation for purchase of sports lottery.

The IC card is portable, and also plays the role of sports lot. Points added to the IC card are used when purchasing the sports lot, and converted into mileage points, etc.

<System>

A user purchases an IC card for buying spots lot. The individual user is validated by inserting the IC card into the receiving terminal device, or by the reading function.

From the sports lottery channel, the past game data, game result prediction, and team and player data are checked. If necessary, the data can be downloaded in the HDD. By the key attached to the terminal, the game to be purchased (or booked) is selected. The single/multi is selected and the number of bets is selected. The game winner and loser are selected. When all items are selected, the confirm and purchase button is pressed. The ticket issue number is recorded in the IC card. Besides, points are added.

The user's purchase data is transmitted to the sports lottery channel site through the communication line, and managed together with the individual data. The result can be confirmed by receiving the sports lottery channel. The winning prize is automatically remitted to the account. However, the automatic remittance is up to the third prize, and the first prize and second prize are paid back directly.

(7) Program Interlocked Two-way Game Using Celebrity Image Data (Still Picture, Moving Picture)

Interlocking with the TV program distributed by mobile broadcast, still picture or moving picture of celebrities is distributed as data broadcast. Each picture is provided with points and data code, plays the role of a trading card. Points differ from one picture to other. By collecting pictures, points are stored and the points are ranked. Or the pictures may be traded through the network.

A program schedule interlocked with the image data schedule to be broadcast is released preliminarily. However, it is unknown which picture data is distributed in which program. It whets the interest to view the program.

<System>

The viewer preliminarily registers to participate in the trading game or registers when participating in the game for the first time. When participation is registered, a personal code is given. By mobile broadcast, the TV program is viewed. In the midst or at the end of the program, image data is distributed together with a quiz associated with the program. However, the image is not known unless answering the quiz. The quiz is a multiple-choice problem.

The program has an storing function and can be viewed whenever, but the image data is limited in valid term, and after the period expires, the image data cannot be obtained if answering the quiz.

The key of the receiving terminal device is used to answer the quiz. Together with the result of quiz, the image of the selected number appears. If failing to answer, no image appears.

The viewer selects whether or not acquire the image, and acquiring, it is downloaded into the HDD.

The image is assigned with individual data code, and the personal code and data code are transmitted through the network. The data is managed at the game site.

As viewing the programs, participating in the quizzes, and acquiring images, the points are collected, and bonuses are granted to the winner or high rank participants in the weekly or monthly unit.

The information of the possessed images can be exchanged between viewers or traded on the network.

(8) Disaster Fighting Channel

Seeing that the mobile broadcast is transmitted nationwide at a same frequency and considering the personal portability, a disaster fighting channel can be opened for transmitting information smoothly in the event of earthquake or other disaster. On the occasion of Kobe Quake, telephone lines were very busy for a specific period, and hence a special channel is reserved for disaster fighting. Usually, this channel is used for weather information or earthquake prediction.

(9) Terminal Dock

By utilizing the features of mobile broadcast, the multichannel receiving function, always storing function, high sound quality music broadcast, and communication function are always updated, and an accommodating adapter with terminal charging function capable of accessing other media is prepared. This adapter is called a dock.

The broadcast distributed while charging the mobile terminal with portable function (that is, while not in use) is stored in a small hard disk incorporated in the charger (dock) from the tuner of the terminal. The stored information can be downloaded in the flash memory, or directly downloaded in the terminal memory. The information downloaded in the flash memory can be taken out and viewed whenever and wherever by inserting into the terminal slot.

By hearing the high sound quality music broadcast of mobile broadcast through the hi-fi speaker incorporated in the dock, it is used as a relaxation tool in a SOHO or the like.

Not limited to mobile broadcast wave, all information required by the user is stored in this dock, by the input function from media such as ISDN, ASDL, FTTH, etc., and the information is rendered mobile completely through the flash memory. Besides, the stored data is arranged in the priority sequence specified by the user. That is, "automatic priority sequence management system" (secretary function) may be also incorporated.

This dock main body may incorporate a small battery and can be used as a cordless unit, and therefore it is used as a seamless compact personal data management center (server) linking with home, office and car, and is evaluated as a core component making the best of the features of mobile broadcast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data broadcasting system comprising:
    program providing means for providing programs for data broadcasting, said programs including plural contents to be used in programs and presentation control data specifying the manner of presentation of each content, by assigning and multiplexing in arbitrary channels in each program, and
    a receiving terminal device which receives the data broadcast programs provided by the program providing means, separates the contents and presentation control data, and presents the contents on the basis of the presentation control data,
    wherein in the receiving terminal device, the program providing means provides plural contents groups as a series of programs, the plural contents groups comprising at least real time reception type contents selectively received and reproduced in real time, first store type contents reproduced after being stored as reception is started by selection, second store type contents read and reproduced when selected as being automatically received and stored, and parallel type contents combining the real time reception type contents and first or second storing type contents, and each of the contents additionally including attribute information indicating one of the real time reception type, the first store type, the second store type and the parallel type, and
    the receiving terminal device receives and reproduces contents based on the attribute information added to each contents.

2. A receiving terminal device used in the data broadcasting system according to claim 1, comprising:
    program selecting means for selecting a program desired by a user from the series of programs, and
    reproducing and storing means for receiving, demodulating and reproducing or storing selectively or simultaneously the plural contents group based on the attribute information added to each of the contents, the group comprising at least the real time reception type contents, first and second store type contents and parallel type contents, depending on the selection operation of the program selecting means.

3. A receiving terminal device used in the data broadcasting system according to claim 2, further comprising noticing means for noticing the user when a content relating to the content being reproduced is broadcast in real time in another channel, or when stored in the receiving terminal device.

4. A receiving terminal auxiliary device used in the data broadcasting system according to claim 2, further comprising coupling means for coupling with the receiving terminal device, and data storage means for reading out and storing the data stored in the receiving terminal device coupled by the coupling means, wherein the data stored in the data storage means is provided to the receiving terminal device coupled by the coupling means according to a request.

5. A receiving terminal auxiliary device used in the data broadcasting system according to claim 4, further comprising receiving means for receiving the data broadcast, wherein the data storage means stores the data obtained by the receiving means.

6. A server used in the data broadcasting system according to claim 1, which provides the contents or information relating to the contents provided by the data broadcast through a communication line.

7. A receiving terminal device used in the data broadcasting system according to claim 6, further comprising communication means for accessing the server through the communication line and acquiring the contents or information provided from the server.

8. A server used in the data broadcasting system according to claim 6, which provides a reproduction key necessary for reproduction of the contents as the information relating to the contents.

9. A receiving terminal device used in the data broadcasting system according to claim 8, wherein the communication means acquires the reproduction key from the server when the content provided by the data broadcast requires the reproduction key for its reproduction.

10. An accounting method used in the data broadcasting system according to claim 8, which charges an account to the user of the receiving terminal device when the receiving terminal device acquires the reproduction key.

11. A contents providing method used in the data broadcasting system according to claim 6, which registers the second contents relating to the first contents provided by the data broadcast in the server, and provides the first and second contents by relating to each other through the data broadcast and the communication line.

12. A contents providing method used in the data broadcasting system according to claim 1, which connects to the server through the communication line to validate individually when acquiring or reproducing the contents provided by the data broadcast in the receiving terminal device.

13. A contents providing method used in the data broadcasting system according to claim 1, which extracts only principal still pictures in the moving picture and broadcasts in synchronism with sound when broadcasting contents composed of moving picture and sound.

14. A receiving terminal auxiliary device used in the data broadcasting system according to claim 1, further comprising charging means for charging a battery when coupling when the receiving terminal device is portable and incorporates the battery.

15. A receiving antenna device used in the data broadcasting system according to claim 1, having an antenna device which receives the data broadcast and an interface for outputting a reception signal by connecting with an external interface of an information processing apparatus.

16. A computer program product for making use of a computer in the receiving terminal device used in the data broadcasting system according to claim 1, comprising:
   computer program code readable means for selecting a program desired by a user from the series of programs, and
   computer program code readable means for reproducing and storing for receiving and demodulating selectively to simultaneously the plural contents group based on the attribute information added to each of the contents, the group comprising at least the real time reception type contents, first and second store type contents and parallel type contents, depending on the selection operation of the program selecting means.

17. A contents providing method used in the data broadcasting system according to claim 1, which provides second stream data composed of second audio data to reproduce plural still pictures of a first image group and the sound in synchronism with the still pictures as the data broadcast program, to first stream data composed of a first image group to reproduce a specified moving picture, and first audio data to reproduce a specified sound in synchronism with the specified moving picture.

18. A contents providing method used in the data broadcasting system according to claim 17, which registers the first stream data in a server, and provides the data from the server through the communication line.

19. A contents providing method used in the data broadcasting system according to claim 18, wherein at least one of validation of the provider and accounting is executed when the server provides the first stream data.

20. A receiving terminal device used in the data broadcasting system according to claim 18, further comprising means for receiving and reproducing second stream data provided by the data broadcast, and means for acquiring and reproducing first stream data provided from the server through the communication line.

21. A receiving antenna device used in the data broadcasting system according to claim 20, further comprising means for processing at least one of validation procedure and accounting charge checking when acquiring the first stream data from the server.

22. A server used in the data broadcasting system according to claim 17, wherein the first stream data is provided through the communication line.

23. A server used in the data broadcasting system according to claim 22, wherein at least one of validation of the provider and accounting is executed when providing the first stream data.

* * * * *